United States Patent [19]
Yamamoto et al.

[11] Patent Number: 5,439,973
[45] Date of Patent: Aug. 8, 1995

[54] CYCLOOLEFIN RESIN COMPOSITION

[75] Inventors: Sanehiro Yamamoto; Toshio Kimura; Takasi Nakagawa; Akinori Toyota, all of Yamaguchi, Japan

[73] Assignee: Mitsui Petrochemical Industries, Ltd., Tokyo, Japan

[21] Appl. No.: 333,337

[22] Filed: Nov. 2, 1994

Related U.S. Application Data

[63] Continuation of Ser. No. 940,316, Sep. 3, 1992, abandoned.

[30] Foreign Application Priority Data

Sep. 12, 1991 [JP] Japan .................. 3-233139
Sep. 12, 1991 [JP] Japan .................. 3-233140
Sep. 12, 1991 [JP] Japan .................. 3-233141
Sep. 12, 1991 [JP] Japan .................. 3-233142

[51] Int. Cl.$^6$ .......................... C08L 77/00
[52] U.S. Cl. ...................... 525/66; 525/179
[58] Field of Search ........................... 525/66

[56] References Cited

FOREIGN PATENT DOCUMENTS 0156464 10/1985 European Pat. Off.
0203799 12/1986 European Pat. Off.
0458365 11/1991 European Pat. Off.
0485631 5/1992 European Pat. Off.

OTHER PUBLICATIONS

Patent Abstracts of Japan, vol. 13, No. 171 (C–588) (3519) Apr. 24, 1989 Abstract of Japanese Laid–Open Patent Publication No. 64-000 141.

Primary Examiner—Ana L. Carrillo
Attorney, Agent, or Firm—Sherman and Shalloway

[57] ABSTRACT

The cycloolefin resin compositions of the present invention comprise:

[A] cycloolefin resin selected from (a-1) a cycloolefin random copolymer having recurring units derived from a cycloolefin of a specific structure, (a-2) a ring opening (co)polymer of the cycloolefin, (a-3) a hydrogenation product of the ring opening (co)polymer and (a-4) a graft-modified product of the random copolymer (a-1), the ring opening (co)polymer (a-2) and the hydrogenation product thereof (a-3);

[B] at least one of (b-1) an unmodified elastomer, (b-2) a modified elastomer, (b-3) an unmodified crystalline polyolefin and (b-4) a modified crystalline polyolefin; and

[C] a polyamide resin. Molded products formed from these cycloolefin resin compositions are excellent particularly in resistance to greases.

15 Claims, No Drawings

CYCLOOLEFIN RESIN COMPOSITION

This application is a continuation of application Ser. No. 07/940,316, filed Sep. 3,1992, now abandoned.

FIELD OF THE INVENTION

The present invention relates to cycloolefin resin compositions capable of forming molded products with excellent resistance to oils, particularly to greases, that is important properties for engineering plastics, and also with a high threshold PV value and high impact resistance.

BACKGROUND OF THE INVENTION

Polyolefins such as polyethylene and polypropylene have excellent molding properties, and they have been conventionally used widely as engineering plastics.

In the use of polyolefins as engineering plastics, products molded from the polyolefins are applied on their engaged portions with greases or the like to increase various properties of the molded products, such as slipperiness, sliding properties and abrasion resistance. Greases are generally prepared by adding a rust-preventing agent, a high-pressure lubricant, an antistatic agent, an anti-corrosive agent, etc. to a base oil having been previously treated with a viscosity builder to have a desired viscosity. Examples of the viscosity builders used herein include alkali metal soap, bentonite and silica gel. Greases are generally classified into lithium grease, benton grease, etc. depending on the kind of the viscosity builder. Since the greases contain various components in addition to the base oil as described above, the engineering plastics to be brought into contact with the greases are required to have properties different from the ordinary oil resistance. For example, lithium grease uses lithium soap as the viscosity builder, and this lithium soap is highly basic, so that the engineering plastic to be brought into contact with the lithium soap is required to show resistance to oils under basic atmosphere. However, polyolefins conventionally used are not always high in resistance to greases.

For improving the grease resistance of the polyolefins used for such purpose and further improving other properties such as heat resistance and rigidity, a method of increasing crystallinity of the polyolefins has been used. In order to increase the crystallinity of the polyolefins, there are known, for example, a method of adding a nucleating agent and a method of slowly cooling the polyolefin in the molten state, but the effects given by those methods are not sufficient.

By the way, it has been reported that a copolymer obtained by copolymerizing ethylene with a bulky monomer is much more improved in various properties such as heat resistance as compared with conventional polyolefins (see: U.S. Pat. No. 2,883,372, Japanese Patent Publication No. 46(1971)-14910, etc.).

Based on such finding that a cycloolefin random copolymer obtained by copolymerizing ethylene and a cycloolefin used as the bulky monomer is excellent in heat resistance, aging resistance, solvent resistance, dielectric properties and rigidity, the present inventor has applied for patents on random copolymers obtained by copolymerizing ethylene and specific cycloolefins (see: Japanese Patent Laid-open Publications No. 60(1985)-168708, No. 61 (1986)-120816, No. 61(1986)-115912, No. 61(1986)-115916, No. 61(1986)-271308, No. 61(1986)-272216, No. 62(1987)-252406 and No. 62(1987)-252407).

The present inventor has found that addition of specific amounts of a specific elastomer (or a crystalline polyolefin) and a polyamide resin to the above-mentioned cycloolefin resins makes it possible to remarkably improve the grease resistance of the molded products, without deteriorating the excellent properties of the cycloolefin resins, and accomplished the invention.

OBJECT OF THE INVENTION

It is an object of the present invention to provide cycloolefin resin compositions which can be molded into products showing small changes in weight and dimension even after contacted with greases and having a high threshold PV value and high impact resistance.

It is another object of the invention is to provide cycloolefin resin compositions which can be molded into products particularly showing excellent resistance to greases, in addition to good mechanical properties (e.g., impact strength), high glossiness, high resistance to solvents and low water absorption.

In more detail, the object of the invention is to provide cycloolefin resin compositions which can be molded into products particularly showing excellent resistance to greases, in addition to good mechanical properties (e.g., impact strength), high resistance to solvents, high surface glossiness and low water absorption, without deterioration of the excellent properties of the cycloolefin resins.

SUMMARY OF THE INVENTION

A first cycloolefin resin composition according to the invention comprises:

[A] at least one cycloolefin resin selected from the group consisting of:
 (a-1) a random copolymer of ethylene and a cycloolefin represented by the following formula [I],
 (a-2) a ring opening polymer or a ring opening copolymer of a cycloolefin represented by the following formula [I], and
 (a-3) a hydrogenation product of the above ring opening polymer or ring opening copolymer;

[B] (b-2) a graft-modified elastomer having a tensile modulus at 23° C. of 0.1 to 2,000 kg/cm$^2$ and being obtained by modifying an elastomer having a tensile modulus at 23° C. of 0.1 to 2,000 kg/cm$^2$ a glass transition temperature of not higher than 0° C. and a crystallinity of not more than 30% with an unsaturated carboxylic acid or its derivative; and

[C] a polyamide resin;
 said cycloolefin resin composition containing the component [A] in an amount of 0.5 to 53 parts by weight, the component [B] in an amount of 2 to 30 parts by weight and the component [C] in an amount of more than 45 parts by weight, each based on 100 parts by weight of the total amounts of the component [A], the component [B] and the component [C].

A second cycloolefin resin composition according to the invention comprises:

[A] at least one cycloolefin resin selected from the group consisting of:
 (a-1) a random copolymer of ethylene and a cycloolefin represented by the following formula [I],
 (a-2) a ring opening polymer or a ring opening copolymer of a cycloolefin represented by the following formula [I], and (a-3) a hydrogenation product of the above ring opening polymer or ring opening copolymer;

[B] (b-2) a graft-modified elastomer having a tensile modulus at 23° C. of 0.1 to 2,000 kg/cm² and being obtained by modifying an elastomer having a tensile modulus at 23° C. of 0.1 to 2,000 kg/cm², a glass transition temperature of not higher than 0° C. and a crystallinity of not more than 30% with an unsaturated carboxylic acid or its derivative, and (b-3) a polyolefin resin having a crystallinity of more than 30% and a tensile modulus at 23° C. of more than 2,000 kg/cm², and/or (b-4) a graft-modified product obtained by modifying the above polyolefin resin with an unsaturated carboxylic acid or its derivative; and

[C] a polyamide resin;

said cycloolefin resin composition containing the component [A] in an amount of 0.5 to 53 parts by weight, the component (b-2) in an amount of 2 to 30 parts by weight and the component [C] in an amount of more than 45 parts by weight, each based on 100 parts by weight of the total amounts of the component [A], the component (b-2) and the component [C], and containing the component (b-3) and/or the component (b-4) in an amount of 0 to 150 parts by weight based on 100 parts by weight of the total amounts of the component [A], the component (b-2) and the component [C].

A third cycloolefin resin composition according to the invention comprises:

[A] (a-4) a graft-modified cycloolefin resin obtained by graft-modifying with a graft monomer at least one clycoolefin polymer selected from the group consisting of:

(a-1) a random copolymer of ethylene and a cycloolefin represented by the following formula [I], (a-2) a ring opening polymer or a ring opening copolymer of a cycloolefin represented by the following formula [I], and (a-3) a hydrogenation product of the above ring opening polymer or ring opening copolymer;

[B] (b-1) an elastomer having a tensile modulus at 23° C. of 0.1 to 2,000 kg/cm², a glass transition temperature of not higher than 0° C. and a crystallinity of not more than 30%, in an amount of 0.5 to 50 parts by weight based on 100 parts by weight of the graft-modified cycloolefin resin (a-4); and

[C] a polyamide resin in an amount of 5 to 300 parts by weight based on 100 parts by weight of the graft-modified cycloolefin resin (a-4).

A fourth cycloolefin resin composition according to the invention comprises:

[A] (a-4) a graft-modified cycloolefin resin obtained by graft-modifying with a graft monomer at least one cycloolefin polymer selected from the group consisting of:

(a-1) a random copolymer of ethylene and a cycloolefin represented by the following formula [I], (a-2) a ring opening polymer or a ring opening copolymer of a cycloolefin represented by the following formula [I], and (a-3) a hydrogenation product of the above ring opening polymer or ring opening copolymer;

[B] (b-1) an elastomer having a tensile modulus at 23° C. of 0.1 to 2,000 kg/cm², a glass transition temperature of not higher than 0° C. and a crystallinity of not more than 30%, in an amount of 0.5 to 50 parts by weight based on 100 parts by weight of the graft-modified cycloolefin resin (a-4), and a crystalline polyolefin composed of:

(b-3) a polyolefin resin having a crystallinity of more than 30% and a tensile modulus at 23° C. of more than 2,000 kg/cm², and/or (b-4) a graft-modified product obtained by modifying the polyolefin resin with an unsaturated carboxylic acid or its derivative, in an amount of 0 to 150 parts by weight based on 100 parts by weight of the graft-modified cycloolefin resin (a-4); and

[C] a polyamide resin in an amount of 5 to 300 parts by weight based on 100 parts by weight of the graft-modified cycloolefin resin (a-4).

A fifth cycloolefin resin composition according to the invention comprises:

[A] at least one cycloolefin resin selected from the group consisting of:

(a-1) a random copolymer of ethylene and a cycloolefin represented by the following formula [I], (a-2) a ring opening polymer or a ring opening copolymer of a cycloolefin represented by the following formula [I], and (a-3) a hydrogenation product of the above ring opening polymer or ring opening copolymer;

[A'] (a-4) a graft-modified product obtained by modifying the random copolymer (a-1), the ring opening polymer or copolymer (a-2) or the hydrogenation product (a-3) with an unsaturated carboxylic acid or its derivative;

[B] (b-2) a graft-modified elastomer having a tensile modulus at 23° C. of 0.1 to 2,000 kg/cm² and being obtained by modifying an elastomer having a tensile modulus at 23° C. of 0.1 to 2,000 kg/cm², a glass transition temperature of not higher than 0° C. and a crystallinity of not more than 30% with an unsaturated carboxylic acid or its derivative; and

[C] a polyamide resin;

said cycloolefin resin composition containing the component [A] in an amount of 0 to 59.5 parts by weight, the component [A'] in an amount of 0.5 to 60 parts by weight, the component [B] in an amount of 2 to 30 parts by weight and the component [C] in an amount of less than 20 parts by weight, each based on 100 parts by weight of the total amounts of the component [A], the component [A'], the component [B] and the component [C].

A sixth cycloolefin resin composition according to the invention comprises:

[A] at least one cycloolefin resin selected from the group consisting of:

(a-1) a random copolymer of ethylene and a cycloolefin represented by the following formula [I], (a-2) a ring opening polymer or a ring opening copolymer of a cycloolefin represented by the following formula [I], (a-3) a hydrogenation product of the above ring opening polymer or ring opening copolymer, and (a-4) a graft-modified product obtained by modifying the random copolymer (a-1), the ring opening polymer or copolymer (a-2) or the hydrogenation product (a-3) with an unsaturated carboxylic acid or its derivative;

[B] at least one crystalline polyolefin selected from the group consisting of:

(b-3) a polyolefin resin having a crystallinity of more than 30% and a tensile modulus at 23° C. of more than 2,000 kg/cm$^2$, and (b-4) a graft-modified product obtained by modifying the above polyolefin resin with an unsaturated carboxylic acid or its derivative, in an amount of 5 to 150 parts by weight based on 100 parts by weight of the cycloolefin resin [A]; and

[C] a polyamide resin in an amount of 5 to 300 parts by weight of 100 parts by weight of the cycloolefin resin [A].

lowing formula [I], namely, a cycloolefin ring opening (co)polymer;

(a-3) a hydrogenation product of the above cycloolefin ring opening (co)polymer, namely, a hydrogenated ring opening (co)polymer; and (a-4) a graft-modified product of the above cycloolefin random copolymer, cycloolefin ring opening (co)polymer or hydrogenated ring opening (co)polymer.

They can be employed singly or in combination of different polymers or copolymers.

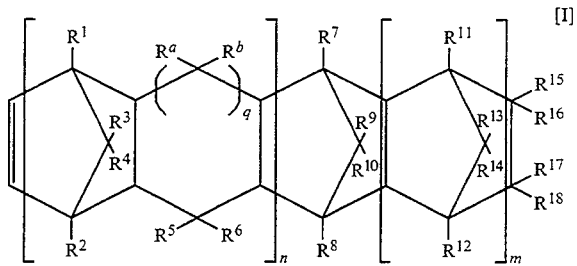

In the formula [I], n is 0 or 1; m is 0 or a positive integer; q is 0 or 1; $R^1$ to $R^{18}$, and $R^a$ and $R^b$ are each independently an atom or a group selected from the group consisting of a hydrogen atom, a halogen atom and a hydrocarbon group; $R^{15}$ to $R^{18}$ may be linked to each other to form a monocyclic or polycyclic group, and the monocyclic or polycyclic group may have a double bond; and $R^{15}$ and $R^{16}$, or $R^{17}$ and $R^{18}$ may form an alkylidene group.

As described above, each of the first to sixth cycloolefin resin compositions according to the invention comprises:

[A] a specific cycloolefin resin;

[B] a specific component selected from a modified elastomer, an unmodified elastomer, a modified crystalline polyolefin and an unmodified crystalline polyolefin; and

[C] a polyamide resin;

each in the specific amounts.

Accordingly, by the use of those compositions, there can be produced molded products showing small change in weight even after they are contacted with various greases for a long period of time. Further, thus obtained molded products have a high threshold PV value and are excellent in impact resistance.

DETAILED DESCRIPTION OF THE INVENTION

The cycloolefin resin compositions according to the present invention are described in detail hereinafter.

The cycloolefin resin compositions according the invention comprise:

[A] a specific cycloolefin resin;

[B] any resin selected from a modified elastomer, an unmodified elastomer, a modified crystalline polyolefin and an unmodified crystalline polyolefin; and

[C] a polyamide resin.

The cycloolefin resins employable as the component [A] in the invention include:

(a-1) a cycloolefin random copolymer in which recurring units derived from ethylene are linked at random to recurring units derived from a cycloolefin represented by the following formula [I];

(a-2) a ring opening polymer or a ring opening copolymer of a cycloolefin represented by the following formula [I], namely, a cycloolefin ring opening (co)polymer;

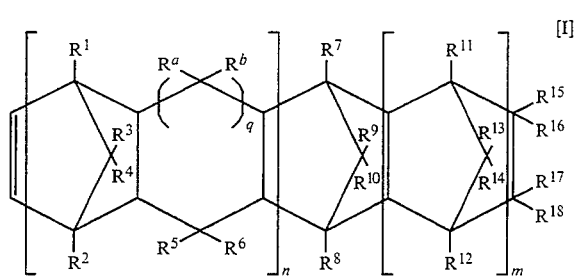

In the formula [I], n is 0 or 1, m is 0 or a positive integer, and q is 0 or 1.

$R^1$ to $R^{18}$, and $R^a$ and $R^b$ are each independently an atom or a group selected from the group consisting of a hydrogen atom, a halogen atom and a hydrocarbon group. Examples of the halogen atoms include a fluorine atom, a chlorine atom, a bromine atom and an iodine atom. The hydrocarbon groups generally are an alkyl group of 1–20 carbon atoms and a cycloalkyl group of 3–15 carbon atoms. Concrete examples of the alkyl groups include methyl group, ethyl group, propyl group, isopropyl group, amyl group, hexyl group, octyl group, decyl group, dodecyl group and octadecyl group. A concrete example of the cycloalkyl group is cyclohexyl group.

Further, $R^{15}$ and $R^{16}$, $R^{17}$ and $R^{18}$, $R^{15}$ and $R^{17}$, $R^{16}$ and $R^{18}$, $R^{15}$ $R^{18}$, or $R^{16}$ and $R^{17}$ may be linked to each other to form (in cooperation) a monocyclic or polycyclic group, and thus formed monocyclic or polycyclic group may have a double bond.

Examples of the monocyclic or polycyclic rings are given below. Those rings may have substituent groups such as methyl group.

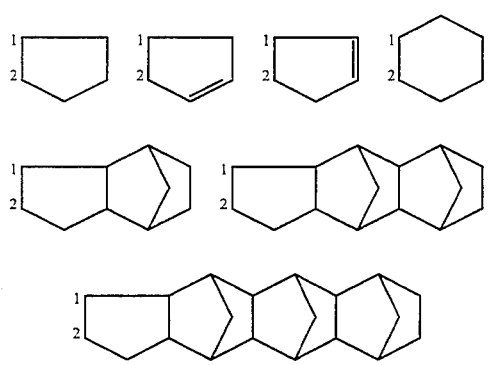

In the above formulas, the carbon atoms indicated by numerals 1 and 2 are carbon atoms of alicyclic structure to which a group indicated by $R^{15}$ to $R^{18}$ in the formula [I] is bonded.

R$^{15}$ and R$^{16}$, or R$^{17}$ and R$^{18}$ in the formula [I] may form an alkylidene group. The alkylidene group generally is an alkylidene group of 2-20 carbon atoms. Concrete examples of such alkylidene groups include ethylidene group, propylidene group and isopropylidene group.

In the above formula [I], when q is 0, a ring represented using q is a 5-membered ring.

The cycloolefin resins as described above have an intrinsic viscosity [η], as measured in decalin at 135° C., of usually 0.01 to 10 dl/g, preferably 0.05 to 10 dl/g, more preferably 0.3 to 2.0 dl/g, most preferably 0.4 to 1.2 dl/g. A softening temperature (TMA) of the cycloolefin resins, as measured using a thermal mechanical analyzer, is usually not lower than 70° C., preferably in the range of 70° to 250° C., more preferably in the range of 70° to 200° C., most preferably in the range of 100° to 180° C. A glass transition temperature (Tg) thereof is usually in the range of 50° to 190° C., preferably in the range of 80° to 170° C., and a crystallinity thereof, as measured by means of X-ray diffractometry, is usually in the range of 0 to 20%, preferably in the range of 0 to 2%.

The cycloolefins represented by the above formula [I] can be easily prepared by condensing cyclopentadienes with corresponding olefins or cycloolefins through Diels-Alder reaction.

The cycloolefins represented by the above formula [I] used in the invention include concretely:
bicyclo[2.2.1]hepto-2-ene derivative,
tetracyclo[4.4.0.1$^{2,5}$.1$^{7,10}$]-3-dodecene derivative, hexacyclo[6.6.1.1$^{3,6}$.1$^{10,13}$.0$^{2,7}$.0$^{9,14}$]-4-heptadecene derivative,
octacyclo[8.8.0.1$^{2,9}$.1$^{4,7}$.1$^{11,18}$.1$^{13,16}$0$^{3,8}$.0$^{12,17}$]-5-docosene derivative,
pentacyclo[6.6.1.1$^{3,6}$.0$^{2,7}$.0$^{9,14}$]-4-hexadecene derivative,
heptacyclo-5-eicosene derivative,
heptacyclo-5-heneicosene derivative,
tricyclo[4.3.0.1$^{2,5}$]-3-decene derivative,
tricyclo[4.3.0.1$^{2,5}$]-3-undecene derivative,
pentacyclo[6.5.1.1$^{3,6}$.0$^{2,7}$.0$^{9,13}$]-4-pentadecene derivative,
pentacyclopentadecadiene derivative,
pentacyclo[4.7.0.1$^{2,5}$.0$^{8,13}$.1$^{9,12}$]-3-pentadecene derivative,
pentacyclo[7.8.0.1$^{3,6}$.0$^{2,7}$.1$^{10,17}$.0$^{11,16}$.1$^{12,15}$]-4-eicosene derivative, and
nonacyclo[9.10.1.1.4.7.0$^{3,8}$.0$^{3,8}$.0$^{12,21}$.1$^{13,20}$.0$^{14,19}$.1$^{15,18}$]-5-pentacosene derivative.

Concrete examples of the above-mentioned compounds are given below.

Tetracyclo[4.4.0.1$^{2,5}$.1$^{7,10}$]-3-dodecene derivatives such as

Bicyclo[2,2,1]hept-2-ene

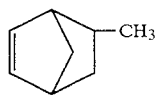

6-Methylbicyclo[2,2,1]hept-2-ene

-continued

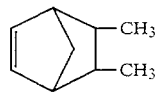

5,6-Dimethylbicyclo[2,2,1]hept-2-ene

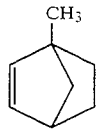

1-Metylbicyclo[2,2,1]hept-2-ene

6-Ethylbicyclo[2,2,1]hept-2-ene

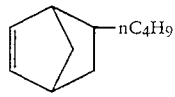

6-n-Butylbicyclo[2,2,1]hept-2-ene

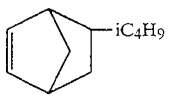

6-Isobutylbicyclo[2,2,1]hept-2-ene

7-Methylbicyclo[2,2,1]hept-2-ene

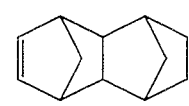

Tetracyclo[4,4,0,1$^{2.5}$,1$^{7.10}$]-3-dodecene

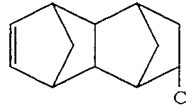

8-Methyltetracyclo[4,4,0,1$^{2.5}$,1$^{7.10}$]-3-dodecene

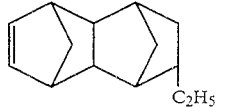

8-Ethyltetracyclo[4,4,0,1$^{2.5}$,1$^{7.10}$]-3-dodecene

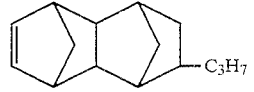

8-Propyltetracyclo[4,4,0,1$^{2.5}$,1$^{7.10}$]-3-dodecene

-continued

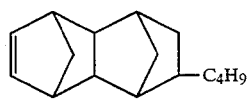
8-Butyltetracyclo[4,4,0,1^{2.5},1^{7.10}]-3-dodecene

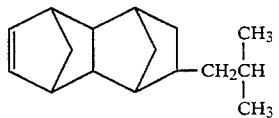
8-Isobutyltetracyclo-[4,4,0,1^{2.5},1^{7.10}]-3-dodecene

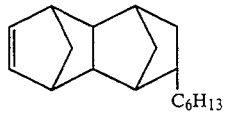
8-Hexyltetracyclo[4,4,0,1^{2.5},1^{7.10}]-3-dodecene

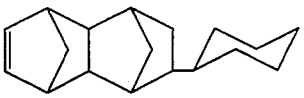
8-Cyclohexyltetracyclo-[4,4,0,1^{2.5},1^{7.10}]-3-dodecene

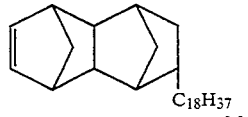
8-Stearyltetracyclo[4,4,0,1^{2.5},1^{7.10}]-3-dodecene

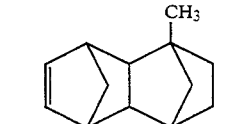
5,10-Dimethyltetracyclo-[4,4,0,1^{2.5},1^{7.10}]-3-dodecene

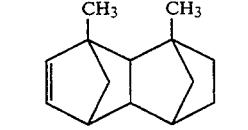
2,10-Dimethyltetracyclo-[4,4,0,1^{2.5},1^{7.10}]-3-dodecene

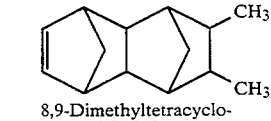
8,9-Dimethyltetracyclo-[4,4,0,1^{2.5},1^{7.10}]-3-dodecene

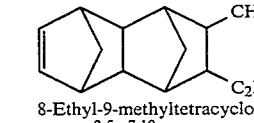
8-Ethyl-9-methyltetracyclo-[4,4,0,1^{2.5},1^{7.10}]-3-dodecene

-continued

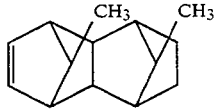
11,12-Dimethyltetracyclo-[4,4,0,1^{2.5},1^{7.10}]-3-dodecene

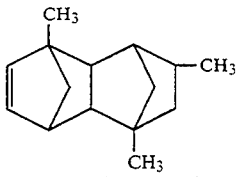
2,7,9-Trimethyltetracyclo-[4,4,0,1^{2.5},1^{7.10}]-3-dodecene

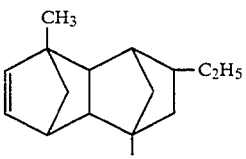
9-Ethyl-2,7-dimethyltetracyclo-[4,4,0,1^{2.5},1^{7.10}]-3-dodecene

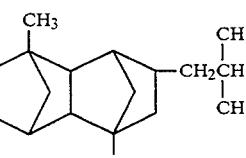
9-Isobutyl-2,7-dimethyltetracyclo-[4,4,0,1^{2.5},1^{7.10}]-3-dodecene

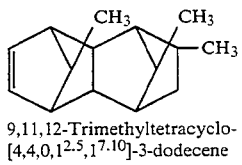
9,11,12-Trimethyltetracyclo-[4,4,0,1^{2.5},1^{7.10}]-3-dodecene

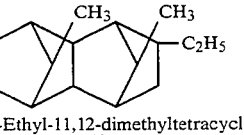
9-Ethyl-11,12-dimethyltetracyclo-[4,4,0,1^{2.5},1^{7.10}]-3-dodecene

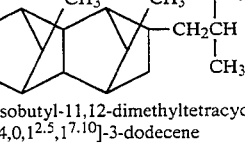
9-Isobutyl-11,12-dimethyltetracyclo-[4,4,0,1^{2.5},1^{7.10}]-3-dodecene

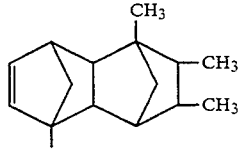
5,8,9,10-Trimethyltetracyclo-[4,4,0,1^{2.5},1^{7.10}]-3-dodecene

-continued

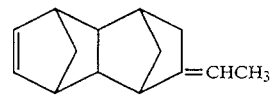
8-Ethylidenetetracyclo-
[4,4,0,1$^{2,5}$,1$^{7,10}$]-3-dodecene

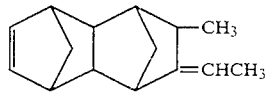
8-Ethylidene-9-methyltetracyclo-
[4,4,0,1$^{2,5}$,1$^{7,10}$]-3-dodecene

8-Ethylidene-9-ethyltetracyclo-
[4,4,0,1$^{2,5}$,1$^{7,10}$]-3-dodecene

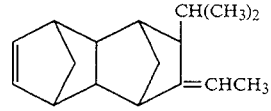
8-Ethylidene-9-isopropyltetracyclo-
[4,4,0,1$^{2,5}$,1$^{7,10}$]-3-dodecene

8-Ethylidene-9-butyltetracyclo-
[4,4,0,1$^{2,5}$,1$^{7,10}$]-3-dodecene

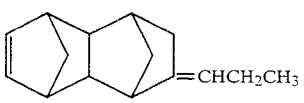
8-n-Propylidenetetracyclo-
[4,4,0,1$^{2,5}$,1$^{7,10}$]-3-dodecene

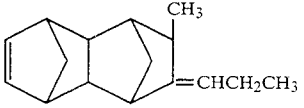
8-n-Propylidene-9-methyltetracyclo-
[4,4,0,1$^{2,5}$,1$^{7,10}$]-3-dodecene

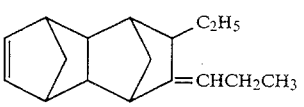
8-n-Propylidene-9-ethyltetracyclo-
[4,4,0,1$^{2,5}$,1$^{7,10}$]-3-dodecene

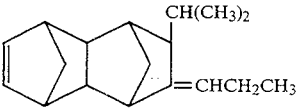
8-n-Propylidene-9-isopropyltetra-
cyclo[4,4,0,1$^{2,5}$,1$^{7,10}$]-3-dodecene

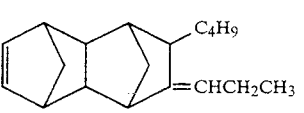
8-n-Propylidene-9-butyltetracyclo-
[4,4,0,1$^{2,5}$,1$^{7,10}$]-3-dodecene -continued

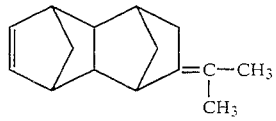
8-Isopropylidenetetracyclo-
[4,4,0,1$^{2,5}$,1$^{7,10}$]-3-dodecene

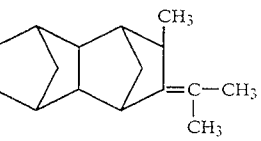
8-Isopropylidene-9-methyltetracyclo-
[4,4,0,1$^{2,5}$,1$^{7,10}$]-3-dodecene

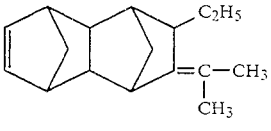
8-Isopropylidene-9-ethyltetracyclo-
[4,4,0,1$^{2,5}$,1$^{7,10}$]-3-dodecene

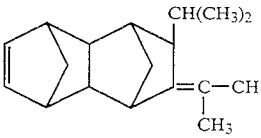
8-Isopropylidene-9-isopropyltetra-
cyclo[4,4,0,1$^{2,5}$,1$^{7,10}$]-3-dodecene

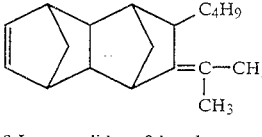
8-Isopropylidene-9-butyltetra-
cyclo[4,4,0,1$^{2,5}$,1$^{7,10}$]-3-dodecene

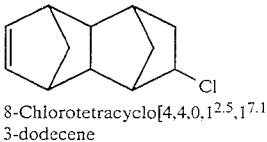
8-Chlorotetracyclo[4,4,0,1$^{2,5}$,1$^{7,10}$]-
3-dodecene

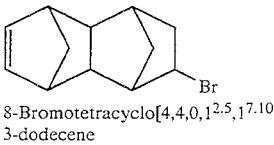
8-Bromotetracyclo[4,4,0,1$^{2,5}$,1$^{7,10}$]-
3-dodecene

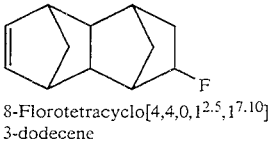
8-Florotetracyclo[4,4,0,1$^{2,5}$,1$^{7,10}$]-
3-dodecene

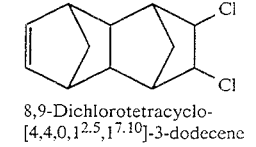
8,9-Dichlorotetracyclo-
[4,4,0,1$^{2,5}$,1$^{7,10}$]-3-dodecene

Hexacyclo[6.6.1.1$^{3,6}$.1$^{10,13}$.0$^{2,7}$.0$^{9,14}$]-4-heptadecene derivatives such as:

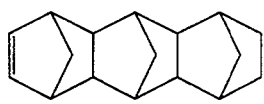

Hexacyclo[6,6,1,1$^{3,6}$,1$^{10,13}$,0$^{2,7}$, 0$^{9,14}$]-4-heptadecene

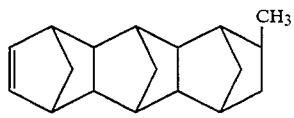

12-Metylhexacyclo[6,6,1,1$^{3,6}$,1$^{10,13}$, 0$^{2,7}$,0$^{9,14}$]-4-heptadecene

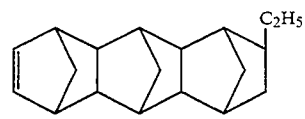

12-Ethylhexacyclo[6,6,1,1$^{3,6}$,1$^{10,13}$, 0$^{2,7}$,0$^{9,14}$]-4-heptadecene

12-Isobutylhexacyclo[6,6,1,1$^{3,6}$, 1$^{10,13}$,0$^{2,7}$,0$^{9,14}$]-4-heptadecene

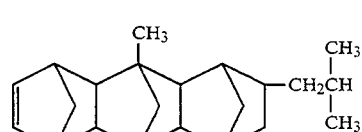

1,6,10-Trimethyl-12-isobutyl-hexacyclo[6,6,1,1$^{3,6}$,1$^{10,13}$,0$^{2,7}$,0$^{9,14}$]-4-heptadecene Octacyclo[8.8.0.1$^{2,9}$.1$^{4,7}$.1$^{11,18}$.1$^{13,16}$.0$^{3,8}$.0$^{12,17}$]-5-docosene derivatives such as:

Octacyclo[8,8,0,1$^{2,9}$,1$^{4,7}$,1$^{11,18}$, 1$^{13,16}$,0$^{3,8}$,0$^{12,17}$]-5-docosene

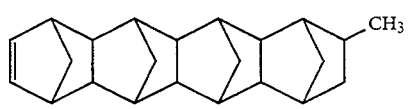

15-Methyloctacyclo[8,8,0,1$^{2,9}$, 1$^{4,7}$,1$^{11,18}$,1$^{13,16}$,0$^{3,8}$,0$^{12,17}$]-5-docosene

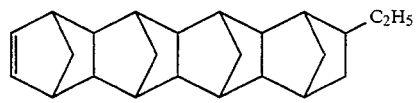

15-Ethyloctacyclo[8,8,0,1$^{2,9}$, 1$^{4,7}$,1$^{11,18}$,1$^{13,16}$,0$^{3,8}$,0$^{12,17}$]-5-docosene Pentacyclo[6,6,1,1$^{3,6}$,0$^{2,7}$,0$^{9,14}$]-4-hexadecene derivatives such as:

Pentacyclo[6,6,1,1$^{3,6}$,0$^{2,7}$,0$^{9,14}$]-4-hexadecene

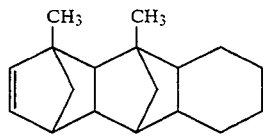

1,3-Dimethylpentacyclo[6,6,1,1$^{3,6}$, 0$^{2,7}$,0$^{9,14}$]-4-hexadecene

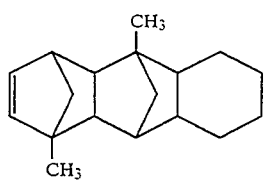

1,3-Dimethylpentacyclo[6,6,1,1$^{3,6}$, 0$^{2,7}$,0$^{9,14}$]-4-hexadecene

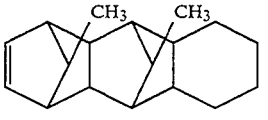

15,16-Dimethylpentacyclo[6,6,1,1$^{3,6}$, 0$^{2,7}$,0$^{9,14}$]-4-hexadecene

Heptacyclo-5-eicosene derivatives or heptacyclo-5-heneicosene derivatives such as:

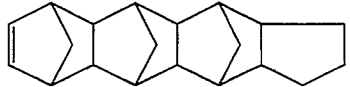

Heptacyclo[8,7,0,1$^{2,9}$,1$^{4,7}$,1$^{11,17}$, 0$^{3,8}$,0$^{12,16}$]-5-eicosene

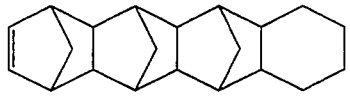

Heptacyclo[8,7,0,1$^{2,9}$,1$^{4,7}$,1$^{11,18}$, 0$^{3,8}$,0$^{12,17}$]-5-heneicosene Tricyclo[4,3,0,1$^{2,5}$]-3-decene derivatives such as:

Tricyclo[4,3,0,1$^{2,5}$]-3-decene

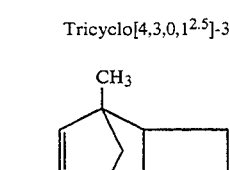

2-Methyltricyclo[4,3,0,1$^{2,5}$]-3-decene

-continued

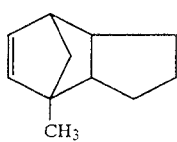

5-Methyltricyclo[4,3,0,1$^{2.5}$]-3-decene

Tricyclo[4,4,0,1$^{2.5}$]-3-undecene derivatives such as:

Tricyclo[4,4,0,1$^{2.5}$]-3-undecene

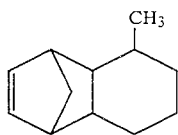

10-Methyltricyclo[4,4,0,1$^{2.5}$]-3-undecene

Pentacyclo[6,5,1,1$^{3.6}$,0$^{2.7}$,0$^{9.13}$]-4-pentadecene derivatives such as:

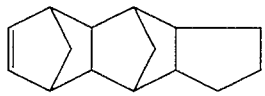

Pentacyclo[6,5,1,1$^{3.6}$,0$^{2.7}$,0$^{9.13}$]-4-pentadecene

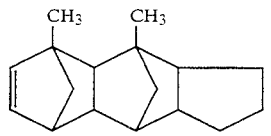

1,3-Dimethylpentacyclo[6,5,1,1$^{3.6}$,0$^{2.7}$,0$^{9.13}$]-4-pentadecene

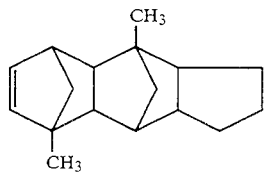

1,6-Dimethylpentacyclo[6,5,1,1$^{3.6}$,0$^{2.7}$,0$^{9.13}$]-4-pentadecene

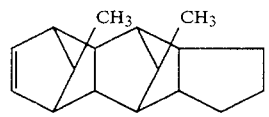

14,15-Dimethylpentacyclo[6,5,1,1$^{3.6}$,0$^{2.7}$,0$^{9.13}$]-4-pentadecene

Diene compounds such as:

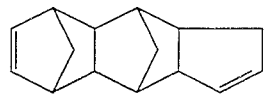

Pentacyclo[6,5,1,1$^{3.6}$,0$^{2.7}$,0$^{9.13}$]-4,10-pentadecadiene

Pentacyclo[4,7,0,1$^{2.5}$,0$^{8.13}$,1$^{9.12}$]-3-pentadecene derivatives such as:

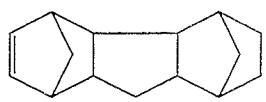

Pentacyclo[4,7,0,1$^{2.5}$,0$^{8.13}$,1$^{9.12}$]-3-pentadecene

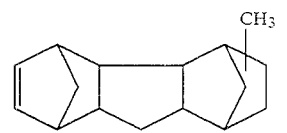

Methyl-substituted pentacyclo[4,7,0,1$^{2.5}$,0$^{8.13}$,1$^{9.12}$]-3-pentadecene Heptacyclo[7,8,0,1$^{3.6}$,0$^{2.7}$,1$^{10.17}$,0$^{11.16}$,1$^{12.15}$]-4-eicosene derivatives such as:

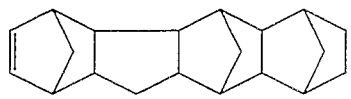

Heptacyclo[7,8,0,1$^{3.6}$,0$^{2.7}$,1$^{10.17}$,0$^{11.16}$,1$^{12.15}$]-4-eicosene

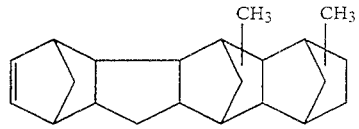

Dimethyl-substituted heptacyclo-[7,8,0,1$^{3.6}$,0$^{2.7}$,1$^{10.17}$,0$^{11.16}$,1$^{12.15}$]-4-eicosene Nonacyclo[9,10,1,1$^{4.7}$,0$^{3.8}$,0$^{2.10}$,0$^{12.21}$,1$^{13.20}$,0$^{14.19}$,1$^{15.18}$]-5-pentacosene derivatives such as:

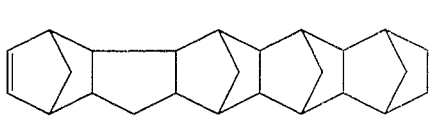

Nonacyclo[9,10,1,1$^{4.7}$,0$^{3.8}$,0$^{2.10}$,0$^{12.21}$,1$^{13.20}$,0$^{14.19}$,1$^{15.18}$]-5-pentacosene

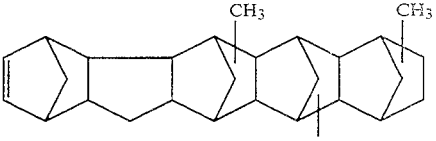

Trimethyl-substituted nonacyclo-[9,10,1,1$^{4.7}$,0$^{3.8}$,0$^{2.10}$,0$^{12.21}$,1$^{13.20}$,0$^{14.19}$,1$^{15.18}$]-5-pentacosene Pentacyclo[8,4,0,1$^{2.5}$,1$^{9.12}$,0$^{8.13}$]-3-hexadecene derivatives such as:

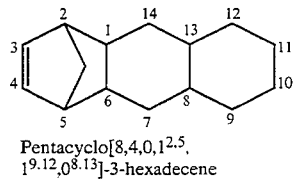

Pentacyclo[8,4,0,1$^{2.5}$, 1$^{9.12}$,0$^{8.13}$]-3-hexadecene

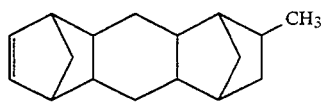

11-Methylpentacyclo [8,4,0,1$^{2.5}$,1$^{9.12}$,0$^{8.13}$]- 3-hexadecene

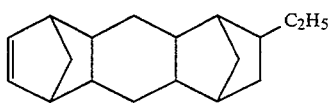

11-Ethylpentacyclo [8,4,0,1$^{2.5}$,1$^{9.12}$,0$^{8.13}$]- 3-hexadecene

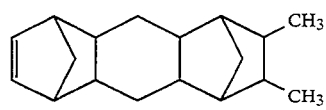

10,11-Dimethylpentacyclo [8,4,0,1$^{2.5}$,1$^{9.12}$,0$^{8.13}$]-3- hexadecene;

Heptacyclo[8,8,0,1$^{4.7}$,1$^{11.18}$,1$^{13.16}$,0$^{3.8}$,0$^{12.17}$]-5-heneicosene derivatives such as:

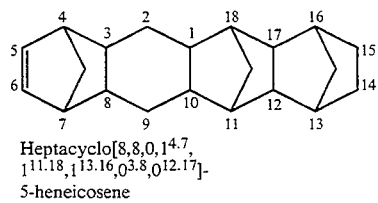

Heptacyclo[8,8,0,1$^{4.7}$, 1$^{11.18}$,1$^{13.16}$,0$^{3.8}$,0$^{12.17}$]- 5-heneicosene

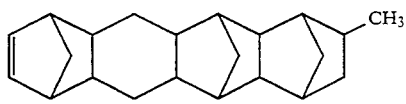

15-Methylheptacyclo[8,8, 0,1$^{4.7}$,1$^{11.18}$,1$^{13.16}$,0$^{3.8}$, 0$^{12.17}$]-5-heneicosene

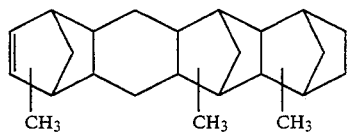

Trimethyl-substituted heptacyclo[8.8.0.1$^{4.7}$. 1$^{11.18}$,1$^{13.16}$,0$^{3.8}$,0$^{12.17}$]- 5-heneicosene Nonacyclo[10,10,1,1$^{5.8}$,1$^{14.21}$,1$^{16.19}$,0$^{2.11}$,0$^{4.9}$,0$^{13.22}$,0$^{15.20}$]-6-hexacosene derivatives such as:

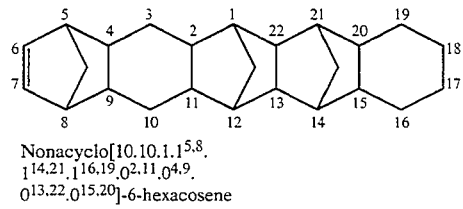

Nonacyclo[10.10.1.1$^{5,8}$. 1$^{14,21}$,1$^{16,19}$,0$^{2,11}$,0$^{4,9}$. 0$^{13,22}$,0$^{15,20}$]-6-hexacosene Next, the cycloolefin random copolymer (a-1) employable as the cycloolefin resin [A] in the invention is described.

The cycloolefin random copolymer (a-1) used as the cycloolefin resin [A] in the invention can be obtained by, for example, copolymerizing ethylene and an unsaturated monomer (cycloolefin) represented by the above formula [I] in a liquid phase in the presence of a catalyst.

In the invention, the monomer copolymerized with the cycloolefin compound represented by the formula [I] to form a cycloolefin random copolymer (a-1) is ethylene. In the cycloolefin random copolymer used in the invention, however, other olefin compounds may also be copolymerized in addition to ethylene used as an olefin compound.

Examples of other olefin compounds copolymerizable with ethylene and the cycloolefin compound represented by the formula [I] include:

α-olefins of 3–20 carbon atoms such as propylene, 1-butene, 4-methyl-1-pentene, 1-hexene, 1-octene, 1-decene, 1-dodecene, 1-tetradecene, 1-hexadecene, 1-octadecene and 1-eicosene;

cycloolefins such as cyclopentene, cyclohexene, 3-methylcyclohexene, cyclooctene and 3a,5,6,7a-tetrahydro-4,7-methano-1H-indene;

non-conjugated dienes such as 1,4-hexadiene, 4-methyl-1,4-hexadiene, 5-methyl-1,4- hexadiene, 1,7-octadiene, dicyclopentadiene, 5-ethylidene-2-norbornene and 5-vinyl-2-norbornene; and norbornenes such as norbornene-2, 5-methylnorbornene-2, 5-ethylnorbornene-2, 5-isopropylnorbornene-2, 5-n-butylnorbornene-2, 5-i-butylnorbornene-2, 5,6-dimethylnorbornene-2, 5-chloronorbornene-2, 2-fluoronorbornene-2 and 5,6-dichloronorbornene-2.

The reaction of ethylene and the cycloolefin represented by the formula [I] is generally carried out in a hydrocarbon solvent.

Examples of the hydrocarbon solvents used herein include aliphatic hydrocarbons such as hexane, heptane, octane and kerosine; alicyclic hydrocarbons such as cyclohexane and methylcyclohexane; and aromatic hydrocarbons such as benzene, toluene and xylene. Also employable as the reaction solvent are compounds which are liquid at the reaction temperature out of polymerizable unsaturated monomers employable for the preparation of the cycloolefin random copolymer. These solvents can be used singly or in combination.

The catalyst used for the reaction of the above-mentioned olefin and the cycloolefin represented by the formula [I] includes catalysts composed of an organoaluminum compound and a vanadium compound which is soluble in a hydrocarbon solvent used as the reaction solvent.

The vanadium compound used for the catalyst is a compound represented by the formula VO(OR)$_a$V$_b$ or a compound represented by the formula V(OR)$_c$X$_d$. In these formulas, R is a hydrocarbon group, and a, b, c and d have relations of $0 \leq a \leq 3$, $0 \leq b \leq 3$, $2 \leq a+b \leq 3$, $0 \leq c \leq 4$, $0 \leq d \leq 4$, and $3 \leq c+d \leq 4$.

The vanadium compound may be an adduct of the vanadium compound represented by the above formula with an electron donor.

Examples of the vanadium compounds include $VOCl_3$, $VO(OC_2H_5)Cl_2$, $VO(OC_2H_5)_2Cl$, $VO(O\text{-}iso\text{-}C_3H_7)Cl_2$, $VO(O\text{-}n\text{-}C_4H_9)Cl_2$, $VO(OC_2H_5)_3$, $VOBr_2$, $VCl_4$, $VOCl_2$, $VO(O\text{-}n\text{-}C_4H_9)_3$ and $VCl_3 \cdot 2(OC_8H_{17}OH)$. These vanadium compounds can be used singly or in combination.

Examples of the electron donors for forming the adduct with the above-mentioned vanadium compounds include alcohols of 1–18 carbon atoms, phenols of 6–20 carbon atoms (these phenols may have a lower alkyl group), ketones of 3–15 carbon atoms, aldehydes of 2–15 carbon atoms, carboxylic acids of 2–30 carbon atoms, esters of organic or inorganic acids, halides of 2–15 carbon atoms, ethers of 2–20 carbon atoms, oxygen-containing electron donors (e.g., acid amides, acid anhydrides and alkoxysilane), and nitrogen-containing electron donors (e.g., ammonia, amine, nitrile and isocyanate). These electron donors can be employed singly or in combination.

The organoaluminum compound employable for the catalyst includes a compound containing at least one Al-carbon bond in the molecule.

Examples of the organoaluminum compounds include the following compounds.

An organoaluminum compound represented by the formula (i) $R^1_m Al(OR^2)_n H_p X_q$ wherein each of $R^1$ and $R^2$ is a hydrocarbon group having usually 1–15 carbon atoms, preferably 1–4 carbon atoms, and they may be the same or different from each other; X is halogen; m, n, p and q are numbers satisfying the conditions of $0 \leq m \leq 3$, $0 \leq n \leq 3$, $0 \leq p < 3$, $0 \leq q < 3$, and $m+n+p+q=3$.

An alkyl complex compound of aluminum and a metal in Group I of a periodic table, which is represented by the formula (ii) $M^1 AlR^1_4$ wherein $M^1$ is Li, Na or K; and $R^1$ has the same meaning as defined above.

Concrete examples of the organoaluminum compounds represented by the above formula (i) includes:

a compound represented by the formula $R^1_m Al(OR^2)_{3-m}$ wherein $R^1$ and $R^2$ have the same meanings as defined above, and m is preferably a number of $1.5 \leq m < 3$;

a compound represented by the formula $R^1_m AlX_{3-m}$ wherein $R^1$ has the same meaning as defined above, X is halogen, and m is preferably a number of $0 < m < 3$;

a compound represented by the formula $R^1_m AlH_{3-m}$ wherein $R^1$ has the same meaning as defined above, and m is preferably a number of $2 \leq m < 3$; and a compound represented by the formula $R^1_m Al(OR^2)_n X_q$ wherein $R^1$ and $R^2$ have the same meanings as defined above, X is halogen, and m, n and q are numbers satisfying the conditions of $0 < m \leq 3$, $0 \leq n < 3$, $0 \leq q < 3$, and $m+n+q=3$.

Concrete examples of the organoaluminum compounds represented by the above formula (ii) include trialkylaluminum; dialkylaluminum alkoxide; alkylaluminum sesquialkoxide; partially alkoxylated alkylaluminum having an average composition, which is represented for example by the formula $R^1_{2.5}Al(OR^2)_{0.5}$; partially halogenated alkylaluminum such as dialkylaluminum halide, alkylaluminum sesquihalide and alkylaluminum dihalide; partially hydrogenated alkylaluminum such as dialkylaluminum hydride and alkylaluminum dihydride; and partially alkoxylated and halogenated alkylaluminum.

The organoaluminum compound may be a compound similar to the compound represented by the formula (ii), such as an organoaluminum compound in which two or more aluminums are linked through oxygen atom or nitrogen atom. Examples of such compounds include $(C_2H_5)_2AlOAl(C_2H_5)_2$, $(C_4H_9)_2AlOAl(C_4H_9)_2$ and $(C_2H_5)_2AlN(C_6H_5)Al(C_2H_5)_2$.

Among the above-exemplified organoaluminum compounds, preferably used are alkylaluminum halide, alkylaluminum dihalide and mixtures thereof.

The vanadium compound is used in an amount of usually 0.01 to 5 g.atom/liter, preferably 0.05 to 3 g.a-tom/liter, in terms of a vanadium atom. As for the amount of the organoaluminum compound, a ratio of an aluminum atom to a vanadium atom (Al/V) in the polymerization reaction system is in the range of usually 2 to 50, preferably 3 to 20.

The cycloolefin random copolymer (a-1) obtained using the above-mentioned catalyst contains recurring units derived from ethylene in an amount of 52 to 90% by mol, preferably 55 to 80% by mol, and contains recurring units derived from cycloolefin in an amount of 10 to 48% by mol, preferably 20 to 45% by mol. When the cycloolefin random copolymer contains recurring units derived from other α-olefins than ethylene, a content of the recurring units derived from those α-olefins in the cycloolefin random copolymer is usually not more than 20% by mol, preferably not more than 10% by mol.

In the cycloolefin random copolymer used in the invention, the recurring units derived from ethylene and the recurring units derived from cycloolefin are substantially linearly arranged, and further these recurring units are arranged at random.

In the cycloolefin random copolymer (a-1) used in the invention, at least a part of the cycloolefins represented by the formula [I] is assumed to have a structure represented by the following formula [II]:

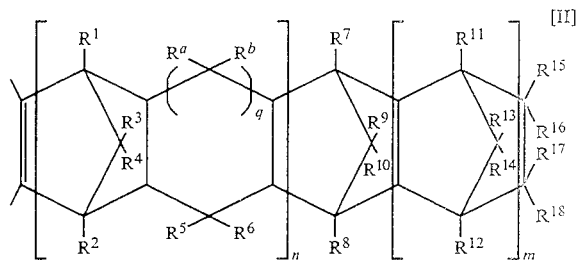

wherein n, m, q, $R^1$–$R^{18}$, $R^a$ and $R^b$ have the same meanings as defined in the formula [I].

The cycloolefin ring opening polymer and cycloolefin ring opening copolymer (a-2) used as the cycloolefin resin A] in the invention are described below.

The cycloolefin ring opening polymer and cycloolefin ring opening copolymer (a-2) can be prepared by, for example, subjecting the cycloolefin represented by the formula [I] to ring opening (co)polymerization in the presence of a catalyst composed of a reducing agent and any of a halide of a metal (e.g., ruthenium, rhodium, palladium, osmium, indium or platinum), a nitrate and an acetylacetone compound, or in the presence of a catalyst composed of an organoaluminum compound and any of a halide of a metal (e.g., titanium, palladium, zirconium or molybdenum) and an acetylacetone compound.

In the cycloolefin ring opening polymer (a-2), at least a part of the cycloolefins represented by the formula [I] is assumed to have a structure represented by the following formula [III]:

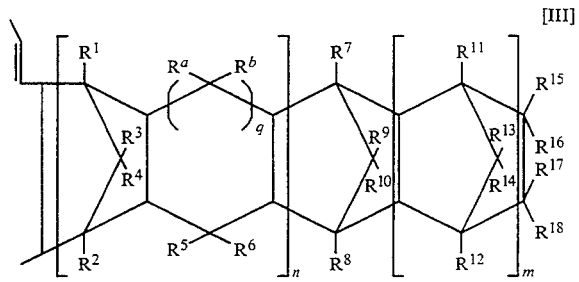

wherein $R^1-R^{18}$, $R^a$, $R^b$, m, n and q have the same meanings as defined in the formula [I].

The hydrogenation product of the above-mentioned ring opening polymer (hydrogenated ring opening polymer) (a-3) can be prepared by reducing the cycloolefin ring opening polymer obtained as above with hydrogen in the presence of a hydrogenation catalyst.

In the cycloolefin ring opening polymer (a-3), at least a part of the cycloolefins represented by the formula [I] is assumed to have a structure represented by the following formula [IV]:

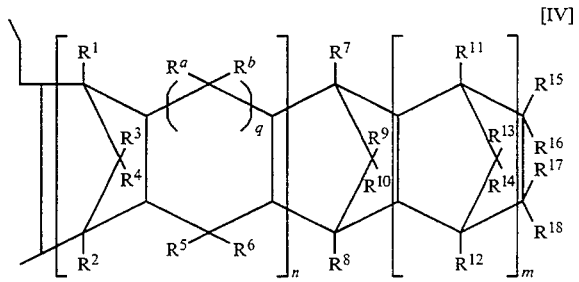

wherein $R^1-R^{18} R^a R_b$, m, n and q have the same meanings as defined in the formula [I].

As the cycloolefin resin [A], also employable in the invention is a graft-modified product (a-4) of the above-mentioned cycloolefin random copolymer (a-1), ring opening polymer or copolymer of cycloolefin (a-2) or the hydrogenation product of the ring opening polymer or copolymer (a-3).

A graft monomer used for preparing the graft-modified product (a-4), namely, a graft-modified cycloolefin resin, employable in the invention preferably is an unsaturated carboxylic acid or its derivative. Examples of the unsaturated carboxylic acids include acrylic acid, maleic acid, fumaric acid, tetrahydrophthalic acid, itaconic acid, citraconic acid, crotonic acid, isocrotonic acid and nadic acid TM (endocis-bicyclo[2,2,1]hepto-5-ene-2,3-dicarboxylic acid). Examples of the derivatives of unsaturated carboxylic acids include unsaturated carboxylic acid anhydride, unsaturated carboxylic acid halide, unsaturated carboxylic acid amide, unsaturated carboxylic acid imide and ester compounds of unsaturated carboxylic acids. Concrete examples of such derivatives include malenyl chloride, maleimide, maleic anhydride, citraconic anhydride, monomethyl maleate, dimethyl maleate, glycidyl maleate, glycidyl acrylate and glycidyl methacrylate.

These graft monomers can be employed singly or in combination.

Among the above-mentioned graft monomers, preferred are unsaturated dicarboxylic acids and anhydrides thereof, and particularly preferred are maleic acid, nadic acid TM, anhydrides of those acids, glycidyl methacrylate and glycidyl acrylate.

The graft-modified cycloolefin resin used in the invention can be prepared by modifying an unmodified cycloolefin resin with the above-mentioned graft monomer by various processes conventionally known. For example, there is known a process of melting an unmodified cycloolefin resin and adding a graft monomer thereto to perform a graft polymerization, or a process of dissolving an unmodified cycloolefin resin and a graft monomer in a solvent to perform a graft copolymerization. Further, for preparing the graft-modified cycloolefin resin, there are also known a process of adding a graft monomer to an unmodified cycloolefin resin to modify the unmodified cycloolefin resin so as to give a graft-modified cycloolefin resin of a desired graft modification rate, a process of beforehand preparing a graft-modified cycloolefin resin of a high graft modification rate and diluting the graft-modified cycloolefin resin of a high graft modification rate with an unmodified cycloolefin resin to give a graft-modified cycloolefin resin of a desired graft modification rate. In the invention, a graft-modified cycloolefin resin prepared by any of the above processes can be employed. The modification rate in the graft-modified cycloolefin resin used in the invention is in the range of usually 0.01 to 5 by weight, preferably 0.1 to 4% by weight.

For efficiently performing a graft copolymerization of the graft monomer, the graft reaction is preferably carried out in the presence of a radical initiator. The graft reaction is generally conducted at a temperature of 60° to 350° C. The radical initiator is used in an amount of usually 0.001 to 5 parts by weight based on 100 parts by weight of the unmodified cycloolefin resin.

As the radical initiator, organic peroxide and organic perester are preferably employed. Concrete examples of such radical initiators include benzoyl peroxide, dichlorobenzoyl peroxide, dicumyl peroxide, di-tert-butyl peroxide, 2,5-dimethyl-2,5-di(peroxidebenzoate)hexyne-3, 1,4-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butylperphenyl acetate, tert-butyl perisobutyrate, tert-butyl per-sec-octoate, tert-butyl perpivalate, cumyl perpivalate and tert-butylperdiethyl acetate. Further, azo compounds can be also employed as the radical initiator in the invention, and concrete examples of the azo compounds include azobisisobutyronitrile and dimethyl azoisobutyrate.

Of these, preferably used as the radical initiator are dialkyl peroxides such as benzoyl peroxide, dicumyl peroxide, di-tert-butyl peroxide, 2,5-dimethyl-2,5-di(-tert-butylperoxy)hexyne-3, 2,5-dimethyl-2,5-di(tert-butylperoxy)hexane and 1,4-bis(tert-butylperoxy isopropyl)benzene.

The elastomer (b-1) which is used as the component [B] and constitutes the composition of the invention together with the above-mentioned cycloolefin resin [A] is a copolymer rubber having a tensile modulus at 23° C. of 0.1 to 2,000 kg/cm², preferably 1 to 1,500 kg/cm².

A glass transition temperature (Tg) of the elastomer (b-1) is not higher than 0° C., preferably in the range of 0° to −150° C., more preferably −80° to −20° C. An intrinsic viscosity [η] of the elastomer, as measured in decalin at 135° C., is usually in the range of 0.2 to 10 dl/g, preferably 1 to 5 dl/g. A density of the elastomer is usually in the range of 0.82 to 0.96 g/cm³, preferably 0.84 to 0.92 g/cm³. Further, a crystallinity of the elastomer, as measured by means of X-ray diffractometry, is usually not more than 30%, preferably not more than 25%, and the elastomer is desired to be low-crystalline or non-crystalline.

An α-olefin copolymer can be used as the elastomer (b-1) in the invention, and concrete examples of the α-olefin copolymers include (i) an ethylene/α-olefin copolymer rubber and (ii) a propylene/α-olefin copolymer rubber. These ethylene/α-olefin copolymer rubber (i) and propylene/α-olefin copolymer rubber (ii) may be used singly or in combination.

Examples of α-olefins constituting the ethylene/α-olefin copolymer rubber (i) include α-olefins of 3–20 carbon atoms such as propylene, 1-butene, 1-pentene, 1-hexene, 4-methyl-1-pentene, 1-octene, 1-decene and mixtures thereof. Of these, particularly preferred is propylene and/or 1-butene.

Examples of α-olefins constituting the propylene/α-olefin copolymer rubber (ii) include α-olefins of 4–20 carbon atoms such as 1-butene, 1-pentene, 1-hexene, 4-methyl-1-pentene, 1-octene, 1-decene and mixtures thereof. Of these, particularly preferred is 1-butene.

The elastomer (b-1) used in the invention may contain recurring units other than the α-olefins, such as recurring units derived from a diene compound, with the proviso that the characteristics of the elastomer are not marred.

Examples of the recurring units permitted to be contained in the elastomer used in the invention include:
 recurring units derived from chain non-conjugated dienes such as 1,4-hexadiene, 1,6-octadiene, 2-methyl-1,5-hexadiene, 6-methyl-1,5-heptadiene and 7-methyl-1,6-octadiene;
 recurring units derived from cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and
 recurring units derived from diene compounds such as 2,3-diisopropylidene-5-norbornene, 2-ethylidene-3-isopropylidene-5-norbornene and 2-propenyl-2,2norbornadiene.

A content of the recurring units derived from such diene compounds as mentioned above in the α-olefin copolymer is usually not more than 10% by mol, preferably not more than 5% by mol.

A molar ratio of ethylene to α-olefin (ethylene/α-olefin) in the ethylene/α-olefin copolymer (i), though varies depending on the kind of α-olefin, is generally in the range of 10/90 to 99/1, preferably 50/50 to 95/5. When the α-olefin is propylene, the molar ratio is preferably in the range of 50/50 to 90/10, and when the number of carbon atoms of the α-olefin is 4 or more, the molar ratio is preferably in the range of 80/20 to 95/5.

A molar ratio of propylene to α-olefin (propylene/α-olefin) in the propylene/α-olefin copolymer (ii), though varies depending on the kind of α-olefin, is generally in the range of 50/50 to 95/5. When the α-olefin is 1-butene, the molar ratio is preferably in the range of 50/50 to 90/10, and when the number of carbon atoms of the α-olefin is 5 or more, the molar ratio is preferably in the range of 80/20 to 95/5.

Among the above-mentioned α-olefin copolymers, preferably used in the invention is an ethylene/propylene random copolymer or an ethylene/α-olefin random copolymer, each having an ethylene content of 35 to 50% by mol and a crystallinity of not more than 10%.

The component [B] in the invention may be a graft-modified elastomer (b-2) which is obtained by modifying the above-mentioned elastomer with an unsaturated carboxylic acid or its derivative.

The unsaturated carboxylic acids employable for preparing the graft-modified elastomer (b-2) include the aforementioned unsaturated carboxylic acids used for preparing the graft-modified product of the cycloolefin resin. The derivatives of the unsaturated carboxylic acids include the aforementioned unsaturated carboxylic acid anhydride, unsaturated carboxylic acid halide, unsaturated carboxylic acid amide, unsaturated carboxylic acid imide and ester compounds of unsaturated carboxylic acids. These graft monomers can be used singly or in combination.

Among the above-mentioned graft monomers, preferred are unsaturated dicarboxylic acids and anhydrides thereof, and particularly preferred are maleic acid, nadic acid ™, anhydrides of those acids, glycidyl methacrylate and glycidyl acrylate.

The graft-modified elastomer (b-2) used in the invention can be prepared by modifying an unmodified elastomer with the above-mentioned graft monomer by various processes conventionally known. For example, there is known a process of melting an unmodified elastomer and adding a graft monomer thereto to perform a graft polymerization, or a process of adding a graft monomer dissolved in a solvent to an unmodified elastomer so as to perform a graft copolymerization. Further, for preparing the graft-modified elastomer, there are also known a process of adding a graft monomer to an unmodified elastomer to modify the unmodified elastomer so as to give a graft-modified elastomer of a desired graft modification rate, a process of beforehand preparing a graft-modified elastomer of a high graft modification rate and diluting the graft-modified elastomer of a high graft modification rate with an unmodified cycloolefin resin to give a graft-modified elastomer of a desired graft modification rate. In the invention, a graft-modified elastomer prepared by any of the above processes can be employed. The modification rate in the graft-modified elastomer used in the invention is generally in the range of 0.01 to 5% by weight, preferably 0.1 to 4% by weight.

For efficiently performing a graft copolymerization of the graft monomer, the graft reaction is preferably carried out in the presence of a radical initiator. The graft reaction is generally conducted at a temperature of 60° to 350° C. The radical initiator is used in an amount of usually 0.001 to 5 parts by weight based on 100 parts by weight of the unmodified elastomer.

As the radical initiator used herein, there can be mentioned the same compounds as described before for preparing the graft-modified cycloolefin resin (a-4). Examples of the radical initiators preferably used herein are the same as those described before.

The graft-modified elastomer (b-2) used in the invention has a tensile modulus, as measured at 23° C. in accordance with ASTM D638, of 0.1 to 2,000 kg/cm$^2$, preferably 1 to 1,500 kg/cm$^2$.

A glass transition temperature (Tg) of such graft-modified elastomer (b-2) is usually in the range of $-150°$ to $+50°$ C. preferably $-80°$ to $-20°$ C. An intrinsic viscosity [$\eta$] of the graft-modified elastomer, as measured in decalin at 135° C., is usually in the range of 0.2 to 10 dl/g, preferably 1 to 5 dl/g. A density thereof is usually in the range of 0.82 to 0.96 g/cm$^3$, preferably 0.84 to 0.92 g/cm$^3$. Further, a crystallinity of the graft-modified elastomer (b-2), as measured by means of X-ray diffractometry, is usually not more than 30%, preferably not more than 25%.

Also employable as the component [B] in the invention is a crystalline polyolefin resin (b-3) and/or a graft-modified product (b-4) obtained by modifying the crystalline polyolefin resin (b-3) with an unsaturated carboxylic acid or its derivative.

The crystalline polyolefin resin (b-3) used herein has a crystallinity, as measured by means of X-ray diffractometry, of more than 30%, preferably more than 40%, more preferably more than 50%. A tensile modulus of the crystalline polyolefin resin (b-3), as measured at 23° C., is more than 2,000 kg/cm$^2$, preferably more than 2,000 kg/cm$^2$ but not more than 30,000 kg/cm$^2$, more preferably more than 2,000 kg/cm$^2$ but not more than 20,000 kg/cm$^2$.

As such crystalline polyolefin resin (b-3), polyethylene or polypropylene can be employed. Useful polyethylene is that containing recurring units derived from ethylene in an amount of generally not less than 50% by mol, preferably not less than 90% by mol. Useful polypropylene is that containing recurring units derived from propylene in an amount of generally not less than 70% by mol, preferably not less than 80% by mol.

This crystalline polyethylene may be either a homopolymer of ethylene or a copolymer of ethylene and a small amount of other $\alpha$-olefin. Examples of the $\alpha$-olefins copolymerized with ethylene include $\alpha$-olefins of 3-20 carbon atoms such as propylene, 1-butene, 1-pentene, 4-methyl-1-pentene, 3-methyl-1-butene and 1-hexene. Examples of the crystalline polyethylene concretely include high-density polyethylene, low-density polyethylene and linear low-density polyethylene (LLDPE). Such crystalline polyethylene generally has a density of 0.82 to 0.96 g/cm$^3$ and an intrinsic viscosity [$\eta$] as measured in decalin at 135° C. of 1 to 5 dl/g.

When the crystalline polyolefin resin (b-3) is polypropylene, this crystalline polypropylene may be either a homopolymer of propylene or a copolymer of propylene and other $\alpha$-olefin. Examples of the $\alpha$-olefin copolymerized with propylene include $\alpha$-olefins of 2-20 carbon atoms (excluding propylene) such as ethylene, 1-butene, 1-pentene, 4-methyl-1-pentene, 3-methyl-1-butene and 1-hexene. Such crystalline polypropylene generally has a density of 0.88 to 0.92 g/cm$^3$ and an intrinsic viscosity [$\eta$] as measured in decalin at 135° C. of 1 to 10 dl/g.

The crystalline polyolefin resin (b-3) may also contain recurring units derived from chain non-conjugated dienes and/or recurring units derived from cyclic non-conjugated dienes, with the proviso that the crystallinity is not marred. A content of the recurring units derived from such non-conjugated dienes in the crystalline polyolefin resin (b-3) used in the invention is usually not more than 5% by mol, preferably not more than 3% by mol.

The graft-modified product (b-4) employable as the component [B] in the invention is a graft-modified product obtained by modifying the above-mentioned crystalline polyolefin resin (b-3) with an unsaturated carboxylic acid or its derivative.

The unsaturated carboxylic acids used herein include the aforementioned unsaturated carboxylic acids used for preparing the graft-modified product of the cycloolefin resin. The derivatives of the unsaturated carboxylic acids include the aforementioned unsaturated carboxylic acid anhydride, unsaturated carboxylic acid halide, unsaturated carboxylic acid amide, unsaturated carboxylic acid imide and ester compounds of unsaturated carboxylic acids. These graft monomers can be used singly or in combination.

Among the above-mentioned graft monomers, preferred are unsaturated dicarboxylic acids and anhydrides thereof, and particularly preferred are maleic acid, nadic acid TM, anhydrides of those acids, glycidyl methacrylate and glycidyl acrylate.

For preparing the graft-modified polyolefin (i.e., graft-modified product) (b-4) from the above-mentioned crystalline polyolefin resin (b-3) using the graft monomer, the similar processes to those used for graft modification of the aforementioned cycloolefin resin can be utilized. The temperature for the graft modification reaction is usually in the range of 60° to 350° C. Similarly to the aforementioned graft modification reaction, it is preferred to use a radical initiator in this graft modification reaction. Examples of the radical initiators preferably used are organic peroxide and organic perester. The amount of the radical initiator is generally in the range of 0.001 to 5 parts by weight based on 100 parts by weight of the unmodified polyolefin.

The modification rate of the graft-modified polyolefin (b-4) is in the range of usually 0.01 to 5% by weight, preferably 0.1 to 4% by weight.

The crystalline polyolefin resin (b-3) is hardly changed in crystallinity, tensile modulus, intrinsic viscosity and density even after it is subjected to the graft modification as mentioned above.

The crystalline polyolefin resin (b-3) and the graft-modified polyolefin (b-4) can be used singly or in combination.

The cycloolefin resin composition of the present invention contains a polyamide resin as the component [C].

As the polyamide resin [C], there can be employed various polyamide resins prepared by a condensation polymerization of a diamine component and a dicarboxylic component, or a ring opening polymerization of a compound capable of forming an amino group and a carboxyl group (e.g., caprolactam) or the functional derivative.

Concrete examples of the polyamide resins employable herein include nylon 6, nylon 66, nylon 610, nylon 11, nylon 612, nylon 12, co-condensation nylon formed from caprolactam and an aqueous salt solution of nylon, nylon MXD6 formed from metaxylenediamine and an adipic acid, nylon 46, methoxymethylated polyamide, polyhexamethylenediamine terephthalamide and polyhexamethylenediamine isophthalamide. These polyamide resins can be employed alone or in combination.

Preferably used as the polyamide resin [C] are a condensate of the above-mentioned diamine component and dicarboxylic acid component, a condensate of $\epsilon$-aminoundecanoic acid, and a ring opening polymer of the above-mentioned lactams, each having an intrinsic viscosity [η], as measured in a 96% sulfuric acid at 25° C., of 0.2 to 2.5 dl/g, particularly preferably 0.5 to 1.8 dl/g.

The first cycloolefin resin composition according to the invention contains:

[A] at least one cycloolefin resin selected from the group consisting of:
(a-1) a random copolymer of ethylene and a cycloolefin represented by the aforementioned formula [I],
(a-2) a ring opening polymer or a ring opening copolymer of a cycloolefin represented by the aforementioned formula [I], and
(a-3) a hydrogenation product of the above ring opening polymer or ring opening copolymer.

The first resin composition of the invention contains this cycloolefin resin [A] in an amount of 0.5 to 53 parts by weight based on 100 parts by weight of the total amounts of the component [A], the component [B] and the component [C]. By incorporation of the cycloolefin resin [A] in such an amount as defined above, a resin composition capable of producing a molded product excellent in both of the grease resistance and the impact strength can be obtained.

Further, the first resin composition contains as the component [B]:
(b-2) a graft-modified elastomer having a tensile modulus at 23° C. of 0.1 to 2,000 kg/cm² and being obtained by modifying an elastomer having a tensile modulus at 23° C. of 0.1 to 2,000 kg/cm², a glass transition temperature of not higher than 0° C. and a crystallinity of not more than 30% with an unsaturated carboxylic acid or its derivative.

The first resin composition of the invention contains this graft-modified elastomer (b-2) which is the component [B] in an amount of 2 to 30 parts by weight based on 100 parts by weight of the total amounts of the component [A], the component [B] and the component [C]. By incorporation of the graft-modified elastomer (b-2) in such an amount as defined above, a resin composition capable of producing a molded product excellent in both of the grease resistance and the impact strength can be obtained.

Furthermore, the first resin composition of the invention contains a polyamide resin [C].

The first resin composition of the invention contains this polyamide resin [C] in an amount of more than 45 parts by weight based on 100 parts by weight of the total amounts of the component [A], the component [B] and the component [C]. In the first resin composition containing the polyamide resin [C] in such an amount as defined above, a favorable structure like sea dotted with islands is formed. This structure is referred to as "sea-island structure" hereinafter. In this sea-island structure, it is presumed that so-called "sea portion" is made of polyamide and so-called "island portion" is made of the component [A] and the component [B]. By the incorporation of the polyamide resin [C], a resin composition capable of producing a molded product excellent in both of the grease resistance and the impact strength can be obtained.

The second cycloolefin resin composition according to the invention contains a specific crystalline polyolefin in addition to the above-mentioned first composition. The crystalline polyolefin is an unmodified crystalline polyolefin resin (b-3) having a specific crystallinity or a graft-modified crystalline polyolefin (b-4) obtained by graft-modifying the unmodified crystalline polyolefin resin (b-3). The second resin composition contains any one of the above-mentioned unmodified crystalline polyolefin resin (b-3) and graft-modified crystalline polyolefin (b-4), or contains both of them, as the crystalline polyolefin.

The second cycloolefin resin composition contains the crystalline polyolefin (b-3) and/or (b-4) in an amount of 0 to 150 parts by weight based on 100 parts by weight of the total amounts of the cycloolefin resin component [A], the graft-modified elastomer component (b-2) and the polyamide resin component [C].

The third cycloolefin resin composition according to the invention contains as the component [A] a graft-modified cycloolefin resin (a-4) obtained by graft-modifying an unmodified cycloolefin resin with a graft monomer.

The cycloolefin resin to be graft-modified herein is at least one cycloolefin resin selected from the group consisting of:
(a-1) a random copolymer of ethylene and a cycloolefin represented by the aforementioned formula [I],
(a-2) a ring opening polymer or a ring opening copolymer of a cycloolefin represented by the aforementioned formula [I], and
(a-3) a hydriogenation product of the above ring opening polymer or ring opening copolymer.

The third resin composition contains an unmodified elastomer (b-1) as the component [B].

This unmodified elastomer (b-1) which is the component [B] is contained in the resin composition in an amount of 0.5 to 50 parts by weight, preferably 5 to 40 parts by weight, more preferably 10 to 30 parts by weight, based on 100 parts by weight of the graft-modified cycloolefin resin (a-4) which is the component [A]. By kneading the above graft-modified cycloolefin resin (a-4) and the above elastomer (b-1), at least a part of the elastomer (b-1) is dispersed in the form of fine grains in the graft-modified cycloolefin resin (a-4).

Further, the third resin composition contains a polyamide resin [C] in an amount of 5 to 300 parts by weight, preferably 10 to 150 parts by weight, more preferably 30 to 60 parts by weight, based on 100 parts by weight of the graft-modified cycloolefin resin (a-4) which is the component [A]. From the resin composition containing the polyamide resin in such an amount as defined above, a molded product particularly excellent in the grease resistance can be produced.

The fourth cycloolefin resin composition according to the invention contains as the component [A] a graft-modified cycloolefin resin (a-4) obtained by graft-modifying an unmodified cycloolefin resin with a graft monomer.

The cycloolefin resin to be graft-modified in the fourth resin composition is at least one cycloolefin resin selected from the group consisting of:
(a-1) a random copolymer of ethylene and a cycloolefin represented by the aforementioned formula [I],
(1-2) a ring opening polymer or a ring opening copolymer of a cycloolefin represented by the aforementioned formula [I], and
(a-3) a hydrogenation product of the above ring opening polymer or ring opening copolymer.

Further, the fourth resin composition contains as the component [B] the above-mentioned unmodified elastomer (b-1) and a crystalline polyolefin, said crystalline polyolefin being composed of:

(b-3) a polyolefin resin having a crystallinity of more than 30% and a tensile modulus at 23° C. of more than 2,000 kg/cm$^2$, and/or (b-4) a graft-modified product obtained by modifying the above polyolefin resin with an unsaturated carboxylic acid or its derivative.

The unmodified elastomer (b-1) which is the component [B] is contained in this fourth resin composition in an amount of 0.5 to 50 parts by weight, preferably 5 to 40 parts by weight, more preferably 10 to 30 parts by weight, based on 100 parts by weight of the graft-modified cycloolefin resin (a-4) which is the component [A]. The polyolefin resin (b-3) and/or its graft-modified product (b-4), which is also the component [B], is contained in this fourth resin composition in an amount of 0 to 150 parts by weight, preferably 10 to 80 parts by weight, more preferably 15 to 40 parts by weight, based on 100 parts by weight of the graft-modified cycloolefin resin (a-4).

The fifth cycloolefin resin composition according to the invention contains as the component [A] at least one cycloolefin resin selected from the group consisting of:

(a-1) a random copolymer of ethylene and a cycloolefin represented by the aforementioned formula [I], (a-2) a ring opening polymer or a ring opening copolymer of a cycloolefin represented by the aforementioned formula [I], and (a-3) a hydrogenation product of the above ring opening polymer or ring opening copolymer.

Further, the fifth resin composition contains as the component [A']:

(a-4) a graft-modified product obtained by modifying the random copolymer (a-1), the ring opening (co)polymer (a-2) or the hydrogenation product (a-3) with an unsaturated carboxylic acid or its derivative.

Furthermore, the fifth resin composition contains as the component [B]:

(b-2) a graft-modified elastomer having a tensile modulus at 23° C. of 0.1 to 2,000 kg/cm$^2$ and being obtained by modifying an elastomer having a tensile modulus at 23° C. of 0.1 to 2,000 kg/cm$^2$, a glass transition temperature of not higher than 0° C. and a crystallinity of not more than 30% with an unsaturated carboxylic acid or its derivative.

The elastomer to be modified in the fifth resin composition corresponds to the aforementioned component (b-1).

Moreover, the fifth resin composition contains a polyamide resin as the component [C].

The component [A] is contained in this fifth resin composition in an amount of 0 to 59.5 parts by weight, preferably 0 to 40 parts by weight, more preferably 0 to 35 parts by weight, most preferably 5 to 35 parts by weight, based on 100 parts by weight of the total amounts of the component [A], the component [A'], the component [B] and the component [C].

The component [A'] is contained in this fifth resin composition in an amount of 0.5 to 60 parts by weight, preferably 0.5 to 55 parts by weight, more preferably 5 to 55 parts by weight, based on 100 parts by weight of the total amounts of the component [A], the component [A'], the component [B] and the component [C].

The component [B] is contained in this fifth resin composition in an amount of 2 to 30 parts by weight, preferably 5 to 30 parts by weight, more preferably 5 to 25 parts by weight, based on 100 parts by weight of the total amounts of the component [A], the component [A'], the component [B] and the component [C].

The component [C] is contained in this fifth resin composition in an amount of less than 20 parts by weight based on 100 parts by weight of the total amounts of the component [A], the component [A'], the component [B] and the component [C].

A ratio between the component [A] and the component [A'] in the fifth resin composition preferably is in the range of 0:60 to 59.5:0.5, by weight.

In the fifth resin composition, it is preferred that the cycloolefin resin [A] is the copolymer (a-1) of ethylene and cycloolefin represented by the formula [I] and the graft-modified product [A'] is a graft-modified product of the above copolymer (a-1). In this case, the component (a-1) is contained in an amount of usually 0 to 59.5 parts by weight, preferably 0 to 40 parts by weight, more preferably 0 to 35 parts by weight; the component [A'] is contained in an amount of usually 0.5 to 60 parts by weight, preferably 0.5 to 55 parts by weight, more preferably 5 to 55 parts by weight; the component [B] is contained in an amount of usually 2 to 30 parts by weight, preferably 5 to 30 parts by weight, more preferably 5 to 25 parts by weight; and the component [C] is contained in an amount of usually less than 20 parts by weight, preferably 5 to 15 parts by weight, each based on 100 parts by weight of the total amounts of the component (a-1), the component [A'], the component [B] and the component [C]. A softening temperature of the component (a-1) preferably is in the range of 70° to 250° C. and an intrinsic viscosity [$\eta$] thereof as measured in decalin at 135° C. preferably is in the range of 0.3 to 2 dl/g. The component [A'] is preferably a maleic anhydride graft-modified product of the copolymer (a-1), the ring opening (co)polymer (a-2) or the hydrogenation product thereof (a-3). A softening temperature of the component [A'] preferably is in the range of 0° to 250° C., and an intrinsic viscosity [$\eta$] thereof as measured in decalin at 135° C. preferably is in the range of 0.1 to 2 dl/g. The graft-modified elastomer [B] preferably is a graft-modified product of a non-crystalline or low-crystalline $\alpha$-olefin elastomeric copolymer formed from at least two kinds of $\alpha$-olefins.

The sixth cycloolefin resin composition according to the invention contains as the component [A] at least one cycloolefin resin selected from the group consisting of:

(a-1) a random copolymer of ethylene and a cycloolefin represented by the aforementioned formula [I], (a-2) a ring opening polymer or a ring opening copolymer of a cycloolefin represented by the aforementioned formula [I], (a-3) a hydrogenation product of the above ring opening polymer or ring opening copolymer, and (a-4) a graft-modified product obtained by modifying the random copolymer (a-1), the ring opening (co)polymer (a-2) or the hydrogenation product (a-3) with an unsaturated carboxylic acid or its derivative.

Further, the sixth resin composition contains as the component [B] at least one crystalline polyolefin selected from the group consisting of:

(b-3) a polyolefin resin having a crystallinity of more than 30% and a tensile modulus at 23° C. of more than 2,000 kg/cm$^2$, and (b-4) a graft-modified product obtained by modifying the above polyolefin resin with an unsaturated carboxylic acid or its derivative.

Furthermore, the sixth resin composition contains a polyamide resin as the component [C].

The component [B] is contained in this sixth composition in an amount of 5 to 150 parts by weight, preferably 10 to 80 parts by weight, more preferably 15 to 40 parts by weight, based on 100 parts by weight of the cycloolefin resin [A]. The component [C] is contained in this sixth composition in an amount of 5 to 300 parts by weight, preferably 10 to 150 parts by weight, more preferably 30 to 60 parts by weight, based on 100 parts by weight of the cycloolefin resin [A]. By incorporation of the polyamide resin in such an amount as defined above, a resin composition capable of producing a molded product particularly excellent in the grease resistance can be obtained.

In the sixth resin composition, it is necessary that any one of the cycloolefin resin [A] and the crystalline polyolefin [B] includes a graft-modified product. Both of them may include a graft-modified product. By the use of a graft-modified product, dispersing condition of each component can be remarkably enhanced in the resulting composition. It is enough that the graft-modified product is included in at least one of the cycloolefin resin [A] and the crystalline polyolefin [B], and a proportion of the graft-modified product in 100% by weight of the total amounts of the cycloolefin resin [A] and the crystalline polyolefin [B] is in the range of usually 2 to 50% by weight, preferably 5 to 30% by weight, more preferably 10 to 20% by weight.

Each of the first to sixth cycloolefin resin compositions according to the invention as illustrated above may contain various additives such as inorganic filler, organic filler, heat stabilizer, weathering stabilizer, antistatic agent, anti-slip agent, anti-blocking agent, anti-fogging agent, lubricant, pigment, dye, natural oil, synthetic oil and wax, in addition to the above-mentioned components.

The cycloolefin resin compositions according to the invention can be prepared by various processes, for example, a process of separately preparing the component [A] and the component [B], then melt-kneading the component [A] and the component [B], and adding the polyamide resin [C] to the obtained kneadate; a process of melt-kneading the component [A], the component [B] and the component [C] together; and a process of melt-kneading the component [B] and the component [C], and then adding the component [A] to the obtained kneadate.

Processes for preparing the resin compositions of the invention are illustrated in more detail hereinafter.

For example, processes for preparing the fifth resin composition of the invention are described below. The fifth resin composition can be prepared by a process comprising mechanically mixing the components [A], [A'], [B] and [C] together and melt-kneading the resulting mixture under heating using a melt-kneading apparatus such as a twin-screw extruder (this process may be referred to as "all-feeding"), or a process comprising mechanically mixing the components [A], [A'] and [B], melt-kneading the resulting mixture under heating using for example a twin-screw extruder, then adding the component [C] to the molten mixture, and kneading them (this process may be referred to as "side-feeding"). The cycloolefin resin compositions of the invention can be prepared by any of the above-mentioned all-feeding and side-feeding by appropriating selecting the processing conditions, but there is a tendency that a diameter of the aforementioned "island portion" formed in the resin composition prepared by the side-feeding process is made smaller and that this resin composition has a narrower particle size distribution, as compared with the resin composition prepared by the all-feeding process.

As described above, in the preparation of the cycloolefin resin composition through the side-feeding process, the components [A], [A'] and [B] are melt-kneaded to form a flow of molten resin, and to the flow of molten resin is added the polyamide resin [C] and they are kneaded. In this case, the polyamide resin [C] can be added in the solid state. Otherwise, it is possible that the polyamide resin [C] is made in the molten state to give a flow of the polyamide resin and this polyamide resin flow is added to the above-mentioned molten resin flow. In this process, addition of the polyamide resin [C] of solid state to the molten resin flow formed by melt-kneading the components [A], [A'] and [B] is preferred. By the addition of the polyamide resin [C] of solid state to the molten resin flow formed by melt-kneading the components [A], [A'] and [B], there can be prepared a resin composition capable of producing a molded product excellent particularly in low-temperature properties, resistance to oils and surface glossiness.

Through such process as mentioned above, pellets having the aforementioned sea-island structure with extremely small sized island portions can be prepared. A mean diameter of the island portions is generally not more than 2 $\mu$m, and in most cases not more than 1 $\mu$m.

In the case of adding the solid polyamide resin [C] to the molten resin flow as described above, the heating temperature is adjusted so that the temperature of the molten resin flow is not abruptly decreased by the addition of the solid polyamide resin [C].

Examples of the processes for preparing the fifth resin composition are described above, and other resin compositions of the invention can be prepared in accordance with those processes.

The first to sixth resin compositions according to the invention show remarkably enhanced grease resistance as compared with cycloolefin resins which are used as the starting materials for those compositions.

Greases conventionally used include those using aliphatic acid salts (metal soaps, e.g., calcium, sodium, aluminum, barium, strontium and lithium), bentonite, silica gel, copper phthalocyanine, allyl urea, etc. as the viscosity builder. Molded products produced from the cycloolefin resin compositions of the invention have such properties that they show small change in weight and are hardly swollen even after contacted with the above-mentioned various greases for a long period of time. Further, among the resin compositions of the invention, molded products obtained from resin compositions containing an elastomer show remarkably enhanced impact strength.

Accordingly, the cycloolefin resin compositions of the invention can be favorably employed for mechanical parts which are generally used with a large amount of grease. That is, the resin compositions of the invention can be favorably employed as so-called engineering plastics.

In addition to common uses of polyolefins, any of the first to sixth cycloolefin resin compositions can be favorably applied to various uses in which mechanical strength is particularly required, for example, uses in which a filler-reinforced PP, an ABS resin or a modified polyphenylene oxide is employed together.

EFFECT OF THE INVENTION

In the cycloolefin resin compositions of the present invention, the cycloolefin resin that is the component [A], the component [B] and the polyamide resin [C] are well dispersed in each other, so that from the compositions of the invention, there can be obtained molded products of high resistance to various greases. In concrete, the products molded from the resin compositions of the invention are extremely low in changes in physical properties such as change in weight even after contacted with various greases for a long period of time.

Further, there are such advantages that the resin compositions of the invention can be greatly reduced in the molding shrinkage as compared with polyamide resins and that the molded products obtained from the resin compositons can be also reduced in the water absorption as compared with the molded products of the polyamide resins.

Furthermore, when the resin compositions contain an elastomer or a modified elastomer as the component [B], the molded products obtained from those compositions have excellent impact resistance. Therefore, the resin compositions of the invention can be preferably employed as materials for forming sliding parts.

Moreover, molded products obtained from the resin compositions of the invention are excellent in not only surface glossiness but also other surface properties such as non-drop-out of the resin on the surface.

The above-mentioned excellent properties of the cycloolefin resin compositions of the invention and molded products thereof can be much more improved when the resin compositions are prepared by adding the polyamide resin [C] through the aforementioned side-feeding process.

EXAMPLE

The present invention is further illustrated below with reference to examples, but it should be construed that the invention is in no way limited to those examples.

[Evaluation method]

Properties of the cycloolefin resins, elastomers, graft-modified elastomers, polyamide resins, crystalline polyolefin resins and graft-modified crystalline polyolefin resins used in the invention and the cycloolefin resin compositions of the invention were measured in the following manners.

Intrinsic viscosity [$\eta$]

The intrinsic viscosity [$\eta$] was measured in decalin at 135° C.

Softening temperature (TMA)

A temperature at which a depth of penetration of a flat-ended needle having a diameter of 1 mm was 100 $\mu$m under the conditions of a rate of temperature elevation of 5° C./min and a load of 50 g was taken as the softening temperature (TMA).

Amount of graft monomer

The amount of a graft monomer was determined by means of $^{13}$C-NMR analysis.

Tensile modulus

The tensile modulus was measured at 23° C. in accordance with ASTM D 638 using a press-molded specimen having a thickness of 2 mm.

Crystallinity

The crystallinity was measured at 23° C. by means of X-ray diffractometry.

Izod (IZ) impact strength

The Izod impact strength was measured at 23° C. in accordance with ASTM D 256 using an injection-molded notched specimen having a thickness of $\frac{1}{8}$ inch.

Flexural modulus (FM)

The flexural modulus (FM) was measured at 23° C. and a crosshead speed of 20 mm/min in accordance with ASTM D 790 using an injection-molded specimen having a thickness of $\frac{1}{8}$ inch.

Flexural strength

The flexural strength was measured at 23° C. in accordance with ASTM D 790 using an injection-molded specimen having a thickness of $\frac{1}{8}$ inch.

Weight change in grease

A grease A (lithium grease, trade name: Multemp TA-2, available from Kyodo Yushi K.K.) and a grease B (benton grease, trade name: Plusguard SG, available from Kyodo Yushi K.K.) were used. After a molded product was immersed in each of those greases at 70° C., a weight change of the molded product was measured.

Threshold PV value

A S45C-steel was used as the opposite material. The threshold PV value was measured under the conditions of a rate of 0.2 m/sec, an initial load of 2.5 kg/cm$^2$ and a stepwise increase of the load by 2.5 kg/cm$^2$/30 min.

Heat distortion temperature (HDT)

The heat distortion temperature was measured in accordance with ASTM D 648.

Preparation Example 1

[Preparation of cycloolefin random copolymer (a-1)]

Ethylene and tetracyclo[4.4.0.1$^{2,5}$.1$^{7,10}$]dodecene-3 (hereinafter abbreviated to "TCD-3") were subjected to a continuous copolymerization reaction in a 1-liter polymerizer equipped with a stirring blade. In detail, into the polymerizer from its upper portion were continuously fed a cyclohexane solution of TCD-3 at a rate of 0.4 liter/hour so that a concentration of TCD-3 in the polymerizer became 60 g/liter, a cyclohexane solution of VO(OC$_2$H$_5$)Cl$_2$ (as a catalyst) at a rate of 0.5 liter/hour so that a concentration of vanadium in the polymerizer became 0.5 mmol/liter (the concentration of vanadium to be fed was 2.86 times of the vanadium concentration in the polymerizer), a cyclohexane solution of ethylaluminum sesquichloride [Al(C$_2$H$_5$)$_{1.5}$Cl$_{1.5}$] at a rate of 0.4 liter/hour so that a concentration of aluminum in the polymerizer became 4.0 mmol/liter, and cyclohexane at a rate of 0.7 liter/hour, while continuously drawing out the polymerization reaction liquid from the bottom portion of the polymerizer so that the amount of the polymerization liquid in the polymerizer was constantly 1 liter (i.e., residence time of the polymerization liquid in the polymerizer was 0.5 hour).

Further, into the polymerization system were fed ethylene at a rate of 30 liters per hour, nitrogen at a rate of 10 liters per hour and hydrogen at a rate of 0.3 liter per hour, using a bubbling tube.

The above copolymerization reaction was carried out at 10° C. with a circulation of a cooling medium in a jacket provided on the outer side of the polymerizer.

Through the copolymerization reaction under the above-described polymerization conditions, an ethylene/TCD-3 random copolymer was obtained.

To the polymerization liquid drawn out of the polymerizer through its bottom portion was added a mixture liquid of cyclohexane and isopropyl alcohol (volume ratio of cyclohexane/isopropyl alcohol: 1/1), and the polymerization reaction was terminated. Then, an aqueous solution containing 5 ml of a concentrated hydrochloric acid in 1 liter of water and the above-obtained polymerization solution were intensively stirred in a proportion of 1:1 using a homomixer to contact them, so as to transfer the catalyst residue into an aqueous phase portion.

The resulting mixture was allowed to stand to remove the aqueous phase portion from the mixture, then washed with a distilled water twice to purify the polymerization liquid, and the polymerization liquid was recovered.

The polymerization liquid thus obtained was brought into contact with acetone in an amount of 3 times of the amount of the polymerization liquid with intensive stirring, and a precipitated solid portion was recovered by means of filtration. The solid portion was well washed with acetone, and then dried at 130° C. and 350 mmHg for 24 hours in a stream of nitrogen.

The above-mentioned operation was continuously carried out to continuously prepare an ethylene/TCD-3 random copolymer at a rate of 76 g per hour (i.e., 38 g/liter).

An ethylene content in this copolymer, as determined by means of $^{13}$C-NMR analysis, was 70% by mol. Further, an intrinsic viscosity [$\eta$] of this copolymer, as measured in decalin at 135° C., was 0.6 dl/g, and a softening temperature (TMA) thereof was 115° C.

Preparation Example 2

[Preparation of cycloolefin random copolymer (a-1)]

Ethylene and tetracyclo[4.4.0.1$^{2,5}$.1$^{7,10}$]dodecene-3 (hereinafter abbreviated to "TCD-3") were subjected to a continuous copolymerization reaction in a 1-liter polymerizer equipped with a stirring blade. In detail, into the polymerizer from its upper portion were continuously fed a cyclohexane solution of TCD-3 at a rate of 0.4 liter/hour so that a concentration of TCD-3 in the polymerizer became 60 g/liter, a cyclohexane solution of VO(OC$_2$H$_5$)Cl$_2$ (as a catalyst) at a rate of 0.5 liter/hour so that a concentration of vanadium in the polymerizer became 0.5 mmol/liter (the concentration of vanadium to be fed was 2.86 times of the vanadium concentration in the polymerizer), a cyclohexane solution of ethylaluminum sesquichloride [Al(C$_2$H$_5$)$_{1.5}$Cl$_{1.5}$] at a rate of 0.4 liter/hour so that a concentration of aluminum in the polymerizer became 4.0 mmol/liter, and cyclohexane at a rate of 0.7 liter/hour, while continuously drawing out the polymerization reaction liquid from the bottom portion of the polymerizer so that the amount of the polymerization liquid in the polymerizer was constantly 1 liter (i.e., residence time of the polymerization liquid in the polymerizer was 0.5 hour).

Further, into the polymerization system were fed ethylene at a rate of 20 liters per hour, nitrogen at a rate of 10 liters per hour and hydrogen at a rate of 0.5 liter per hour, using a bubbling tube.

The above copolymerization reaction was carried out at 10° C. with a circulation of a cooling medium in a jacket provided on the outer side of the polymerizer.

Through the copolymerization reaction under the above-described polymerization conditions, an ethylene/TCD-3 random copolymer was obtained.

To the polymerization liquid drawn out of the polymerizer through its bottom portion was added a mixture liquid of cyclohexane and isopropyl alcohol (volume ratio of cyclohexane/isopropyl alcohol: 1/1), and the polymerization reaction was terminated. Then, an aqueous solution containing 5 ml of a concentrated hydrochloric acid in 1 liter of water and the above-obtained polymerization solution were intensively stirred in a proportion of 1:1 using a homomixer to contact them, so as to transfer the catalyst residue into an aqueous phase portion.

The resulting mixture was allowed to stand to remove the aqueous phase portion from the mixture, then washed with a distilled water twice to purify the polymerization liquid, and the polymerization liquid was recovered.

The polymerization liquid thus obtained was brought into contact with acetone in an amount of 3 times of the amount of the polymerization liquid with intensive stirring, and a precipitated solid portion was recovered by means of filtration. The solid portion was well washed with acetone, and then dried at 130° C. and 350 mmHg for 24 hours in a stream of nitrogen.

The above-mentioned operation was continuously carried out to continuously prepare an ethylene/TCD-3 random copolymer at a rate of 76 g per hour (i.e., 38 g/liter).

An ethylene content in this copolymer, as determined by means of $^{13}$C-NMR analysis, was 63% by mol. Further, an intrinsic viscosity [$\eta$] of this copolymer, as measured in decalin at 135° C., was 0.5 dl/g, an iodine value thereof was 1.0, and a softening temperature (TMA) thereof was 150° C.

The above-obtained cycloolefin random copolymer (a-1) is referred to as "PO-1" hereinafter.

Preparation Example 3

[Preparation of graft-modified cycloolefin copolymer (a-4)]

100 parts by weight of the ethylene/TCD-3 random copolymer obtained in Preparation Example 1 was mixed with 1 part by weight of maleic anhydride and 0.2 part by weight of 2,5-dimethyl-2,5-di(t-butylperoxy)hexyne-3 (trade name: Peroxyne 25B, available from Nippon Yushi K.K.), and the resulting mixture was melt-kneaded at 260° C. using a vented twin-screw extruder having a diameter of 30 mm, to obtain a graft-modified cycloolefin copolymer (a-4).

The amount of the maleic anhydride added in the graft-modified cycloolefin copolymer (a-4) thus obtained was 0.83% by weight.

Preparation Example 4

[Preparation of graft-modified cycloolefin copolymer (a-4)]

100 parts by weight of PO-1 obtained in Preparation Example 2 was mixed with 1 part by weight of maleic anhydride and 0.2 part by weight of 2,5-dimethyl-2,5-di(t-butylperoxy)hexyne-3 (trade name: Peroxyne 25B, available from Nippon Yushi K.K.), and the resulting mixture was melt-kneaded at 260° C. using a vented twin-screw extruder having a diameter of 30 mm, to obtain a graft-modified cycloolefin copolymer (a-4).

The amount of the maleic anhydride added in the graft-modified cycloolefin copolymer (a-4) thus obtained was 0.83% by weight.

The graft-modified cycloolefin copolymer (a-4) is referred to as "GPO-1" hereinafter.

Preparation Example 5

[Unmodified elastomer (b-1)]

An ethylene/propylene copolymer having an ethylene content of 80% by mol, an intrinsic viscosity [$\eta$] as measured in decalin at 135° C. of 2.2 dl/g, MFR as measured at 230° C. of 0.7 g/10min, Tg of −54° C. and an elastic modulus of 400 kg/cm² was used as an elastomer (b-1).

Preparation Example 6

[Preparation of graft-modified elastomer (b-2)]

100 parts by weight of an ethylene/propylene copolymer having an ethylene content of 80% by mol and an intrinsic viscosity [$\eta$] as measured in decalin at 135° C. of 2.2 dl/g (this copolymer being referred to as "MP-0" hereinafter) was mixed with 1 part by weight of maleic anhydride and 0.2 part by weight of 2,5-dimethyl-2,5-di(t-butylperoxy)hexyne-3, and the resulting mixture was melt-kneaded at 260° C. using a vented twin-screw extruder having a diameter of 30 mm, to obtain a graft-modified elastomer (b-2).

The amount of the maleic anhydride added in the graft-modified elastomer (b-2) thus obtained was 0.90% by weight.

The graft-modified elastomer (b-2) is referred to as "MP-1" hereinafter.

Preparation Example 7

[Crystalline polyolefin (b-3)]

An ethylene/4-methyl-1-pentene copolymer having MFR as measured at 230° C. of 18 g/10min, a crystallinity of 50%, a density of 0.92 g/cm³, an elastic modulus of 3,000 kg/cm² and an ethylene content of 97% by mol was used as a crystalline polyolefin (b-3).

Preparation Example 8

[Preparation of graft-modified crystalline polyethylene (b-4)]

100 parts by weight of a high-density polyethylene (MFR as measured at 230° C.: 0.03 g/10min, crystallinity: 60% density: 0.95 g/cm³) was mixed with 1 part by weight of maleic anhydride and 0.2 part by weight of 2,5-dimethyl-2,5-di(t-butylperoxy)hexyne-3 (trade name: Peroxyne 25B, available from Nippon Yushi K.K.), and the resulting mixture was melt-kneaded at 260° C. using a vented twin-screw extruder having a diameter of 30 mm, to obtain a graft-modified crystalline polyethylene (b-4). The amount of the maleic anhydride added in the graft-modified crystalline polyethylene (b-4) thus obtained was 0.97% by weight.

Example 1

100 parts by weight of the cycloolefin random copolymer obtained in Preparation Example 1, 10 parts by weight of the graft-modified elastomer obtained in Preparation Example 3 and 60 parts by weight of nylon 6 (trade name: Amiran CM1007, available from Toray Industries, Inc.) were together melt-kneaded at 250° C. using a vented twin-screw extruder having a diameter of 30 mm, to obtain a cycloolefin resin composition.

The resin composition thus obtained was dried at 100° C. for 8 hours, and then molded into a specimen for measuring physical properties and an angular plate (molded product) at 250° C. using an injection molding machine (30 EPN type, produced by Toshiba IS) having a mold temperature of 70° C.

Physical properties of the specimen and molded product are set forth in Table 1.

As is evident from the results set forth in Table 1, the molded product was excellent in impact strength, rigidity and heat resistance, and showed small change in weight even after immersed in greases.

Comparative Example 1

The procedure of Example 1 was repeated except for not using the graft-modified elastomer and using 0.2 part by weight of hexamethylenediamine instead of nylon 6, to prepare a cycloolefin resin composition. Using this resin composition, a specimen and an angular plate (molded product) were prepared in the same manner as described in Example 1, and the physical properties thereof were measured.

The physical properties of the specimen and molded product are set forth in Table 1.

As is evident from the results set forth in Table 1, the molded product was good in impact resistance, rigidity and heat resistance, but had extremely high percentages in weight change after immersed in greases as compared with the molded product obtained in Example 1.

TABLE 1

| | Ex. 1 | Compar. Ex. 1 |
|---|---|---|
| Cycloolefin resin (parts by weight) | 46 | 100 |
| Graft modified elastomer (parts by weight) | 9 | 0 |
| Crystalline polyolefin (parts by weight) | 10 | 11 |
| Polyamide | | |
| Kind | Nylon-6 | Hexamethylenediamine |
| Amount (parts by weight) | 45 | 0.2 |
| Frexual strength (Kg/cm²) | 810 | 980 |
| Frexual modulus (Kg/cm²) | 21000 | 26000 |
| Notched Izod impact strength (Kg · cm/cm) | 30 | 3 |
| HDT (°C.) | 114 | 120 |
| Weight change in grease | | |
| grease A | 0.1 | 7.0 |
| grease B | 0.2 | 0.9 |
| Threshold PV value (Kg · m/cm · min.) | >300 | >300 |

Example 2

100 parts by weight of the graft-modified cycloolefin random copolymer "GPO-1" obtained in Preparation Example 4 and 10 parts by weight of the elastomer of Preparation Example 5 were together melt-kneaded at 230° C. using a vented twin-screw extruder having a diameter of 30 mm, to prepare a pre-mixture.

Then, 60 parts by weight of nylon 6 (trade name: Amiran CM1007, available from Toray Industries, Inc) and the above-obtained pre-mixture were kneaded at 250° C. using the same extruder as mentioned above, to obtain a cycloolefin resin composition.

The resin composition thus obtained was dried at 100° C. for 8 hours, and then molded into a specimen for measuring physical properties and an angular plate (molded product) at 250° C. using an injection molding machine (30 EPN type, produced by Toshiba IS) having a mold temperature of 70° C.

Physical properties of the specimen and molded product are set forth in Table 2.

As is evident from the results set forth in Table 2, the molded product was excellent in impact strength, rigidity and heat resistance, and showed small change in weight even after immersed in greases.

Comparative Example 2

The procedure of Example 2 was repeated except for not using the elastomer and using 0.2 part by weight of hexamethylenediamine instead of nylon 6, to prepare a cycloolefin resin composition. Using this resin composition, a specimen and an angular plate (molded product) were prepared in the same manner as described in Example 2, and the physical properties thereof were measured.

The physical properties of the specimen and molded product are set forth in Table 2.

As is evident from the results set forth in Table 2, the molded product was good in impact resistance, rigidity and heat resistance, but had extremely high percentages in weight change after immersed in greases as compared with the molded product obtained in Example 2.

Example 3

The procedure of Example 2 was repeated except for further adding 10 parts by weight of the crystalline polyolefin of Preparation Example 7 (crystallinity: 50%, density: 0.92 g/cm$^3$, elastic modulus: 3,000 kg/cm$^2$) based on 100 parts by weight of the graft-modified cycloolefin, to prepare a cycloolefin resin composition. Using this resin composition, a specimen and an angular plate (molded product) were prepared in the same manner as described in Example 2, and they were measured on the physical properties.

The physical properties of the specimen and molded product are set forth in Table 2.

As is evident from the results set forth in Table 2, the molded product was excellent in impact strength, rigidity and heat resistance, and showed low change in weight even after immersed in grease.

TABLE 2

|  | Ex. 2 | Compar. Ex. 2 | Ex. 3 |
|---|---|---|---|
| Graft modified Cycloolefin resin (parts by weight) | 100 | 100 | 100 |
| Unmodified cycloolefin resin (parts by weight) | 0 | 0 | 0 |
| Elastomer (parts by weight) | 20 | 0 | 20 |
| Crystalline polyolefin (parts by weight) | 0 | 11 | 10 |
| Polyamide |  |  |  |
| Kind | Nylon-6 | Hexs methylene-diamine | Nylon-6 |
| Amount (parts by weight) | 60 | 0.2 | 60 |
| Frexual strength (Kg/cm$^2$) | 890 | 980 | 850 |
| Frexual modulus (Kg/cm$^2$) | 24000 | 26000 | 22000 |
| Notched Izod impact strength (Kg · cm/cm) | 13 | 3 | 16 |
| HDT (°C.) | 118 | 120 | 115 |
| Weight change in grease |  |  |  |
| grease A | 3.9 | 7.0 | 3.7 |
| grease B | 0.4 | 0.9 | 0.3 |
| Threshold PV value (Kg · m/cm · min.) | >300 | >300 | >300 |

Example 4

In this example, a twin-screw extruder having a diameter of 30 mm in which feeding of a resin is possible in the middle of the melt-kneading procedure of resin was used.

Hereinafter, adding of a resin or resin composition (A) to a resin or resin composition (B) which is in the middle of the melt-kneading procedure by the use of the above-mentioned extruder is expressed by "side-feeding of A to B". In contrast, melt-kneading of A and B together is hereinafter expressed by "all-feeding of A and B".

That is, 68 parts by weight of the cycloolefin random copolymer (PO-1) obtained in Preparation Example 2, 18 parts by weight of the graft-modified cycloolefin copolymer (GPO-1) obtained in Preparation Example 4 and 14 parts by weight of the graft-modified elastomer (MP-1) obtained in Preparation Example 6 were kneaded together in the above-mentioned extruder (pre-set temperature: 230° C.) to obtain a resin composition. To 100 parts by weight of the resin composition was side-fed 23 parts by weight of a polyamide resin (nylon 6, trade name: Amiran CM1007, available from Toray Industries, Inc.), to prepare a cycloolefin resin composition.

The polyolefin resin composition thus obtained was dried at 120° C. for 8 hours, and then molded into a specimen for measuring physical properties and an angular plate (molded product) at 270° C. using an injection molding machine (30 EPN type, produced by Toshiba IS) having a mold temperature of 70° C.

Physical properties of the specimen and molded product are set forth in Table 3.

As is evident from the results set forth in Table 3, a molded product excellent in grease resistance, impact strength, rigidity and heat resistance was obtained from the cycloolefin resin composition.

Subsequently, the specimen was dyed with a ruthenium acid or an osmium acid to give a test sample for observation by means of a transmission electron microscope. When the test sample was observed by a transmission electron microscope, dispersed particles of spherical form (or elliptical form) were confirmed. A mean particle diameter of the dispersed particles was not more than 1 μm.

Example 5

The procedure of Example 4 was repeated except for varying the amounts of PO-1, GPO-1, MP-1 and the polyamide resin to 61.5 parts by weight, 22 parts by weight, 16.5 parts by weight and 11 parts by weight, respectively, to prepare a cycloolefin resin composition. From the resin composition, a specimen and an angular plate (molded product) were formed in the same manner as described in Example 4, and the physical properties thereof were measured.

The results on the physical properties of the specimen and molded product are set forth in Table 3.

As is evident from the results set forth in Table 3, a molded product excellent in grease resistance, impact strength, rigidity and heat resistance was obtained from the resin cycloolefin composition.

Subsequently, using the specimen, a test sample was prepared in the same manner as described in Example 4. When the test sample was observed by a transmission electron microscope, dispersed particles of spherical form (or elliptical form) were confirmed. A mean particle diameter of the dispersed particles was not more than 1 μm.

Comparative Example 3

The procedure of Example 5 was repeated except for using the unmodified cycloolefin copolymer (PO-1) instead of the graft-modified cycloolefin copolymer (GPO-1), to obtain a cycloolefin resin composition. From the resin composition, a specimen and an angular plate (molded product) were prepared in the same manner as described in Example 5, and the physical properties thereof were measured.

The results on the physical properties of the specimen and molded product are set forth in Table 3.

As is evident from the results set forth in Table 3, the molded product obtained from the resin composition was good in rigidity and heat resistance but was deteriorated in grease resistance.

TABLE 3

|  | Ex. 4 | Ex. 5 | Compar. Ex. 3 |
|---|---|---|---|
| Cycloolefin random copolymer (a-1) | PO-1 | PO-1 | PO-1 |
| Graft modified Cycloolefin random copolymer (a-4) | GPO-1 | GPO-1 | GPO-1 |
| Graft modified elastomer (b-2) | MP-1 | MP-1 | MP-1 |
| Polyamide (c) | CM1007 | CM1007 | CM1007 |
| Composition of resin (a-1)/(a-4)/(b-2)/(c) | 55/15/11/19 | 55/20/15/10 | 75/0/15/10 |
| Process of feeding | Side-feeding | side-feeding | Side-feeding |
| IZ (Kg · cm/cm) | 15 | 34 | 17 |
| FM (Kg/cm$^2$) | 22000 | 19700 | 24000 |
| HDT (°C.) | 136 | 130 | 125 |
| Weight change in grease (%) | 0.5 | 0.8 | 1.3 |

Example 6

90 parts by weight of the cycloolefin random copolymer obtained in Preparation Example 1, 10 parts by weight of the graft-modified cycloolefin random copolymer obtained in Preparation Example 3 and 11 parts by weight of the graft-modified crystalline polyethylene obtained in Preparation Example 8 were melt-kneaded together at 230° C. using a vented twin-screw extruder having a diameter of 30 mm, to obtain a pre-mixture.

The pre-mixture thus obtained and nylon 6 (trade name: Amiran CM1007, available from Toray Industries, Inc) were kneaded using the above-mentioned extruder, to obtain a cycloolefin resin composition.

This resin composition was dried at 100° C. for 8 hours, and then molded into a specimen for measuring physical properties and an angular plate (molded product) at 250° C. using an injection molding machine (30EPN type, produced by Toshiba IS) having a mold temperature of 70° C.

Physical properties of the specimen and molded product are set forth in Table 4.

As is evident from the results set forth in Table 4, the molded product was excellent in impact strength, rigidity and heat resistance, and showed small change in weight even after immersed in greases.

Comparative Example 4

The procedure of Example 6 was repeated except for not using the graft-modified cycloolefin random copolymer, varying the amount of the unmodified cycloolefin random copolymer to 100 parts by weight, and using 0.2 part by weight of hexamethylenediamine instead of nylon 6, to prepare a cycloolefin resin composition. Using this resin composition, a specimen and an angular plate (molded product) were prepared in the same manner as described in Example 6, and the physical properties thereof were measured.

The physical properties of the specimen and molded product are set forth in Table 4.

As is evident from the results set forth in Table 4, the molded product was good in impact resistance, rigidity and heat resistance, but had extremely high percentages in weight change after immersed in greases as compared with the molded product obtained in Example 6.

Examples 7-10

The procedure of Example 6 was repeated except for varying the amounts of the resins to those set forth in Table 4, to prepare cycloolefin resin compositions. Using those resin compositions, specimens and molded products were prepared in the same manner as described in Example 6, and the physical properties thereof were measured.

The physical properties of the specimens and molded products are set forth in Table 4.

As is evident from the results set forth in Table 4, the molded products were excellent in impact strength, rigidity and heat resistance, and showed small change in weight even after immersed in greases.

TABLE 4

|  | Ex. 5 | Compar. Ex. 4 | Ex. 6 |
|---|---|---|---|
| Cycloolefin resin (Preparation Ex. 1) (parts by weight) Graft modified | 90 | 100 | 90 |
| Cycloolefin resin (Preparation Ex.3) (parts by weight | 10 | 0 | 10 |
| Crystalline polyolefin (Preparation Ex.7) (parts by weight) | 0 | 0 | 0 |
| Graft modified polyolefin (Preparation Ex.8) (parts by weight) | 11 | 11 | 11 |
| Polyamide | | | |
| Kind | Nylon-6 | Hexs methylene-diamine | Nylon-6 |
| Amount (parts by weight) | 48 | 0.2 | 111 |
| Frexual strength (Kg/cm$^2$) | 1000 | 980 | 940 |
| Frexual modulus (Kg/cm$^2$) | 26000 | 26000 | 23000 |
| Notched Izod impact strength (Kg · cm/cm) | 5 | 3 | 3 |
| Weight change in grease | | | |
| grease A | 0.8 | 7.0 | 0.4 |
| grease B | 0.5 | 0.9 | 0.3 |
| Threshold PV value (Kg · m/cm · min.) | >300 | >300 | >300 |

|  | Ex. 7 | Ex. 8 | Ex. 9 | Ex. 10 |
|---|---|---|---|---|
| Cycloolefin resin (Preparation Ex. 1) (parts by weight) | 100 | 100 | 100 | 100 |
| Graft modified Cycloolefin resin (Preparation Ex. 3) (parts by weight) | 0 | 0 | 0 | 0 |
| Crystalline polyolefin (Preparation Ex. 7) (parts by | 0 | 0 | 0 | 15 |

TABLE 4-continued

| weight) | | | | |
|---|---|---|---|---|
| Graft modified polyolefin (Preparation Ex. 8) (parts by weight) | 25 | 25 | 11 | 10 |
| Polyamide Kind | Nylon-6 | Nylon-6 | Nylon-66 | Nylon-6 |
| Amount (parts by weight) | 54 | 291 | 48 | 54 |
| Frexual strength (Kg/cm²) | 1000 | 1000 | 980 | 970 |
| Frexual modulus (Kg/cm²) | 26000 | 27000 | 28100 | 24000 |
| Notched Izod impact strength (Kg · cm/cm) | 5 | 7 | 5 | 5 |
| Weight change in grease | | | | |
| grease A | 1.7 | 0.2 | 1.2 | 1.7 |
| grease B | 0.3 | 0.4 | 0.1 | 0.5 |
| Threshold PV value (Kg · m/cm · min.) | >300 | >300 | >300 | >300 |

What is claimed is:

1. A cycloolefin resin composition comprising:
   (A) at least one cycloolefin resin selected from the group consisting of:
     (a-1) a random copolymer of ethylene and a cycloolefin represented by the following formula (I),
     (a-2) a ring opening polymer or a ring opening copolymer of a cycloolefin represented by the following formula (I), and
     (a-3) a hydrogenation product of said ring opening polymer or said ring opening copolymer;
   (A') (a-4) a graft-modified product obtained by modifying the random copolymer (a-1), the ring opening polymer or copolymer (a-2) or the hydrogenation product thereof (a-3) with an unsaturated carboxylic acid or its derivative;
   (B) (b-2) a graft-modified α-olefin copolymer rubber having a tensile modulus at 23° C. of 0.1 to 2,000 kg/cm² and being obtained by modifying an elastomer having a tensile modulus at 23° C. of 0.1 to 2,000 kg/cm², a glass transition temperature of not higher than 0° C. and a crystallinity of not more than 30% with an unsaturated carboxylic acid or its derivative; and
   (C) a polyamide resin;
   said cycloolefin resin composition containing the component (A) in an amount of 0 to 59.5 parts by weight, the component (A') in an amount of 0.5 to 60 parts by weight, the component (B) in an amount of 2 to 30 parts by weight and the component (C) in an amount of less than 20 parts by weight, each based on 100 parts by weight of the total amounts of the component (A), the component (A'), the component (B) and the component (C);

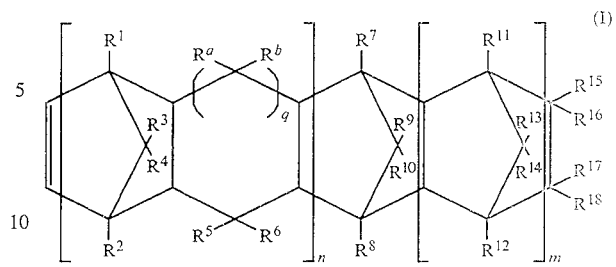

wherein
n is 0 or 1;
m is 0, 1 or 2;
q is 0 or 1;
$R^1$ to $R^{18}$, and $R^a$ and $R^b$ are each independently selected from the group consisting of hydrogen atom, halogen atom and hydrocarbon group;
with the proviso that $R^{16}$ to $R^{18}$ can link to each other to form a monocyclic or polycyclic group, and the monocyclic or polycyclic group can have a double bond; and
with the further proviso that $R^{15}$ and $R^{16}$ together can form an alkylidene group or $R^{17}$ and $R^{18}$ together can form an alkylidene group.

2. The cycloolefin resin composition as claimed in claim 1, wherein the cycloolefin resin [A] is a random copolymer (a-1) of ethylene and a cycloolefin represented by the formula [I]; the graft-modified product [A'] is a graft-modified product of the random copolymer (a-1); and the composition containing the component (a-1) in an amount of 0 to 59.5 parts by weight, the component [A'] in an amount of from more than 0.5 to 60 parts by weight, the component [B] in an amount of 2 to 30 parts by weight and the component [C] in an amount of less than 20 parts by weight based on 100 parts by weight of the total amounts of the component (a-1), the component [A'], the component [B] and the component [C].

3. The cycloolefin resin composition as claimed in claim 1 or claim 13, wherein the component (a-1) has a softening temperature of 70° to 250° C. and an intrinsic viscosity [η] as measured in decalin at 135° C. of 0.3 to 2 dl/g.

4. The cycloolefin resin composition as claimed in claim 1 or claim 13, wherein the component [A'] has a softening temperature of 0° to 250° C. and an intrinsic viscosity [η] as measured in decalin at 135° C. of 0.1 to 2.0 dl/g.

5. The cycloolefin resin composition as claimed in claim 1 of claim 13, wherein the graft-modified cycloolefin resin [A'] is a maleic anhydride graft-modified cycloolefin resin.

6. The cycloolefin resin composition as claimed in claim 1 or claim 13, wherein the graft-modified α-olefin copolymer rubber [B] is a graft-modified product of a non-crystalline or low-crystalline α-olefin elastomeric copolymer formed from at least two kinds of α-olefins.

7. The cycloolefin resin composition as claimed in claim 1 or claim 13, wherein the graft-modified α-olefin copolymer rubber [B] is a maleic anhydride-modified product.

8. The cycloolefin resin composition as claimed in claim 1, wherein the component (B) is the graft-modified α-olefin copolymer rubber (b-2) having a glass transition temperature (Tg) in the range of −150° C. to 50° C.

9. The cycloolefin resin composition as claimed in claim 1 or 8, wherein the component (B) is the graft-modified α-olefin copolymer rubber (b-2) having an intrinsic viscosity (η), as measured in decalin at 135° C., in the range of 0.2 to 10 dl/g.

10. The cycloolefin resin composition as claimed in claim 1, wherein the component (B) is the graft-modified α-olefin copolymer rubber obtained by modifying an elastomer selected from the group consisting of ethylene/α-olefin copolymer rubber and propylene/α-olefin copolymer rubber.

11. The cycloolefin resin composition as claimed in claim 1, wherein the component (A) has a glass transition temperature (Tg) in the range of 50° C. to 190° C.

12. The cycloolefin resin composition as claimed in claim 1, wherein the component (A') has a glass transition temperature (Tg) in the range of 50° C. to 190° C.

13. The cycloolefin resin composition as claimed in claim 1, which contains the component (A) in an amount of 5 to 59.5 parts by weight based on 100 parts by weight of the total amounts of the component (A), the component (A'), the component (B) and the component (C).

14. The cycloolefin resin composition as claimed in claim 1, which contains the component (A) in an amount of 5 to 40 parts by weight based on 100 parts by weight of the total amounts of the component (A), the component (A'), the component (B) and the component (C).

15. The cycloolefin resin composition as claimed in claim 1, which contains the component (A) in an amount of 5 to 35 parts by weight based on 100 parts by weight of the total amounts of the component (A), the component (A'), the component (B) and the component (C).

* * * * *